US012661906B1

(12) United States Patent
Zimmerman et al.

(10) Patent No.: US 12,661,906 B1
(45) Date of Patent: Jun. 23, 2026

(54) DUPLEX PRINTER AND METHODS OF MAKING AND USING THE SAME

(71) Applicant: Rekon, LLC, Pittsburg, KS (US)

(72) Inventors: Randy Zimmerman, Fort Scott, KS (US); Vince Seiwert, Pittsburg, KS (US); Donald R Park, Fort Scott, KS (US)

(73) Assignee: Rekon, LLC, Pittsburg, KS (US)

( * ) Notice: Subject to any disclaimer, the term of this patent is extended or adjusted under 35 U.S.C. 154(b) by 331 days.

(21) Appl. No.: 18/185,971

(22) Filed: Mar. 17, 2023

Related U.S. Application Data

(60) Provisional application No. 63/368,682, filed on Jul. 18, 2022, provisional application No. 63/269,509, filed on Mar. 17, 2022.

(51) Int. Cl.

| | |
|---|---|
| ***B41J 3/407*** | (2006.01) |
| ***B41J 11/00*** | (2006.01) |
| ***B41J 15/04*** | (2006.01) |
| ***B41J 15/18*** | (2006.01) |

(52) U.S. Cl.
CPC ........... *B41J 3/4075* (2013.01); *B41J 11/007* (2013.01); *B41J 15/046* (2013.01); *B41J 15/18* (2013.01)

(58) Field of Classification Search
CPC ........ B41J 3/407; B41J 3/4075; B41J 11/007; B41J 11/02; B41J 11/04; B41J 15/04; B41J 15/048
See application file for complete search history.

(56) References Cited

U.S. PATENT DOCUMENTS

| | | | | |
|---|---|---|---|---|
| 2008/0017321 | A1* | 1/2008 | Crouch | B65C 9/1865 156/391 |
| 2009/0015647 | A1* | 1/2009 | Rawlings | B41J 11/0015 347/213 |
| 2009/0120578 | A1* | 5/2009 | Ogawa | B65C 11/0289 156/760 |
| 2014/0138278 | A1* | 5/2014 | Kennedy | G06Q 90/00 206/459.5 |
| 2014/0267477 | A1* | 9/2014 | Raming | B41J 3/4075 347/9 |
| 2017/0266944 | A1* | 9/2017 | Park | B65C 9/0006 |
| 2020/0399008 | A1* | 12/2020 | Ohisa | B65C 9/42 |

* cited by examiner

*Primary Examiner* — Douglas X Rodriguez
*Assistant Examiner* — Kendrick X Liu
(74) *Attorney, Agent, or Firm* — AVEK IP, LLC

(57) ABSTRACT

A duplex printer system for printing indicia on a first label and a second label includes a printer housing, a print head, a label tray configured to receive the first label and the second label after printing, a peel bar configured to remove a liner matrix from the first label and the second label, a label roller configured to propel the first label and the second label through the printer housing, a driven roller configured to propel the liner matrix through the printer housing, and, a pause sensor. The pause sensor is configured to detect a presence of the first label within the label tray. The label roller is configured to roll back the second label a first distance after the first label is printed to bring the second label into a print-ready position.

16 Claims, 20 Drawing Sheets

DUPLEX PRINTER AND METHODS OF MAKING AND USING THE SAME

RELATED APPLICATIONS

This application claims priority to U.S. Provisional Application No. 63/269,509, filed Mar. 17, 2022. This application also claims priority to U.S. Provisional Application No. 63/368,682, filed Jul. 18, 2022. The disclosure of each of these applications is incorporated herein by reference in their entireties.

FIELD OF THE DISCLOSURE

The disclosure relates generally to the field of printing labels. More specifically, the disclosure relates to the field of printers for double sided printing having a liner peel system.

BRIEF SUMMARY OF INVENTION

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In some aspects, the techniques described herein relate to a duplex printer system, for printing indicia on a first label and a second label, including: a printer housing; a print head; a label tray configured to receive the first label and the second label after printing; a peel bar configured to remove a liner matrix from the first label and the second label; a label roller configured to propel the first label and the second label through the printer housing; a driven roller configured to propel the liner matrix through the printer housing; and, a pause sensor; wherein: the driven roller propels the liner matrix away from the label tray; the driven roller propels the liner matrix faster than the label roller propels the first label and the second label; the pause sensor is configured to detect a presence of the first label within the label tray; the duplex printer system is configured to halt movement of the second label in response to a pause sensor detection of the first label within the label tray; and, the label roller is configured to roll back the second label a first distance after the first label is printed to bring the second label into a print-ready position.

In some aspects, the techniques described herein relate to a system, further including an automated label application arm configured to pick up the first label and the second label from the label tray after printing.

In some aspects, the techniques described herein relate to a system, wherein: the first label and the second label exit the printer housing in a first direction; and, the label roller is configured to adjust the position of the first label or the second label in the label tray in a second direction perpendicular to the first direction.

In some aspects, the techniques described herein relate to a system, wherein the label roller is configured to adjust the position of the first label or the second label in the label tray up to 4 millimeters in the second direction and up to 4 millimeters in the third direction.

In some aspects, the techniques described herein relate to a system, wherein the second label is not printed until after the second label backs up.

In some aspects, the techniques described herein relate to a system, wherein the first distance is up to 1.5 inches.

In some aspects, the techniques described herein relate to a system, wherein the driven roller is configured to roll back the liner matrix a second distance after the first label is printed, the second distance being less than the first distance.

In some aspects, the techniques described herein relate to a system, further including a tube charged with a vacuum, wherein the driven roller is further configured to direct the liner matrix into the tube.

In some aspects, the techniques described herein relate to a system if claim 8, further including a matrix processor and a pump operably coupled to the tube, the matrix processor being configured to receive the liner matrix from the tube and shred the liner matrix into smaller portions.

In some aspects, the techniques described herein relate to a system, wherein: the first label has a width side and a length side, the length side being larger than the width side; and, the printer housing, the label roller, and the label tray are configured to receive the first label along the length side.

In some aspects, the techniques described herein relate to a system, wherein the print head is configured to rotate up to 360° to change an orientation of the indicia printed on the first label.

In some aspects, the techniques described herein relate to a system, wherein the driven roller propels the liner matrix in a range of 2% to 7% faster than the label roller propels the first label and the second label.

In some aspects, the techniques described herein relate to a system, wherein the print head is repositionable to change a print location of indicia on the first label and the second label.

In some aspects, the techniques described herein relate to a method of operating a duplex printer system, the duplex printer system being configured to print indicia on a first label and a second label, the duplex printer system including a printer housing, a print head, a label tray configured to receive the first label and the second label after printing, a peel bar configured to remove a liner matrix from the first label and the second label, a label roller configured to propel the first label and the second label through the printer housing, a driven roller configured to propel the liner matrix through the printer housing, and a pause sensor, the method including the steps of: printing indicia on the first label; depositing the first label in the label tray; detecting a presence of the first label in the label tray with the pause sensor; halting movement of the second label in response to the pause sensor detection; backing up the second label to a print-ready position with the label roller after the first label is removed from the label tray; peeling the liner matrix from the first label and the second label with the peel bar; and, directing the liner matrix away from the label tray with the driven roller.

In some aspects, the techniques described herein relate to a method, further including the step of backing up the liner matrix a distance when the second label is rewound to the print-ready position.

In some aspects, the techniques described herein relate to a method, further including the step of adjusting a position of the first label in the label tray in response to a pause sensor reading that the first label is misaligned.

In some aspects, the techniques described herein relate to a method, wherein: the first label and the second label exit the printer housing in a first direction; and, the step of adjusting the position of the first label in the label tray in response to the pause senor reading includes adjusting the position of the first label up to 4 millimeters in a second direction perpendicular to the first direction and up to 4 millimeters in a third direction opposing the second direction.

In some aspects, the techniques described herein relate to a method, further including the steps of: running the first label and the second label through the printer housing such along a length-side of the first label and the second label; and, reorienting the print head to change a print location of the indicia on the first label and the second label.

In some aspects, the techniques described herein relate to a method, further including the steps of: directing, with the driven roller, the liner matrix through a vacuum charged tube to a matrix processor; and, cutting the liner matrix into smaller portions with the matrix processor.

In some aspects, the techniques described herein relate to a duplex printer system, for printing indicia on a first label and a second label, including: a printer housing; a print head; a label tray configured to receive the first label and the second label after printing; a peel bar configured to remove a liner matrix from the first label and the second label; a label roller configured to propel the first label and the second label through the printer housing; a driven roller configured to propel the liner matrix through the printer housing; and, a pause sensor; wherein: the driven roller propels the liner matrix away from the label tray; the pause sensor is configured to detect a presence of the first label within the label tray; the duplex printer system is configured to halt printing of the second label in response to the pause sensor detection of the first label presence within the label tray, and resume printing on the second label after the first label is removed from the label tray.

BRIEF DESCRIPTION OF THE SEVERAL VIEWS OF THE DRAWINGS

Illustrative embodiments of the present disclosure are described in detail below with reference to the attached drawing figures.

DETAILED DESCRIPTION

Figure 1A:
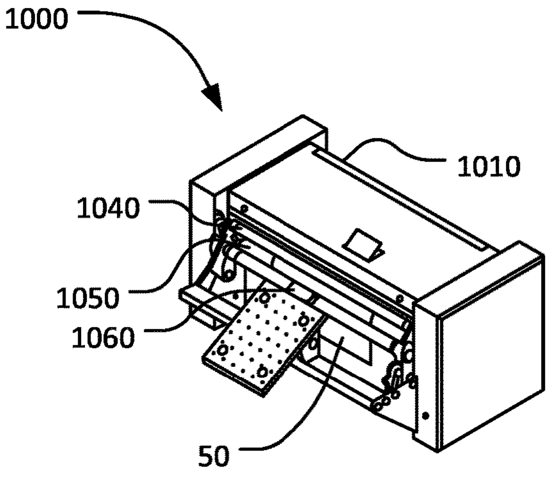
FIG. 1A is a perspective view of a duplex printer, according to an embodiment of the disclosure.
Figure 1B:
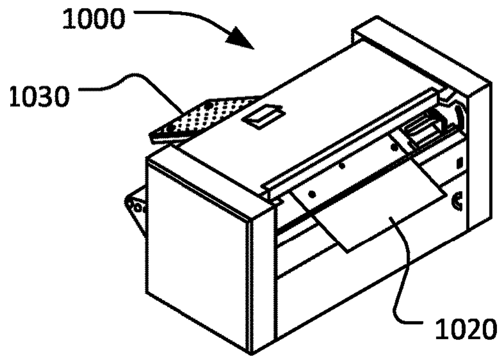
FIG. 1B is another perspective view of the duplex printer of FIG. 1A.
Figure 1C:
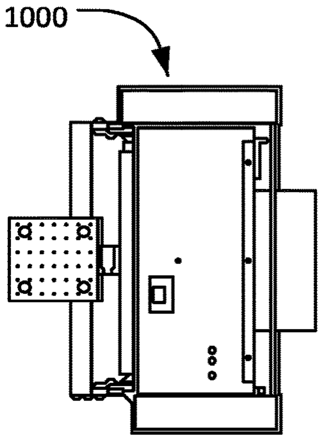
FIG. 1C is a top view of the duplex printer of FIG. 1A.
Figure 1D:
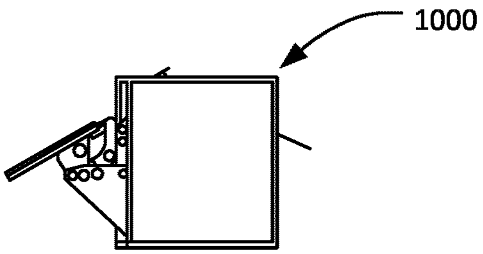
FIG. 1D is a side view of the duplex printer of FIG. 1A.
Figure 1E:
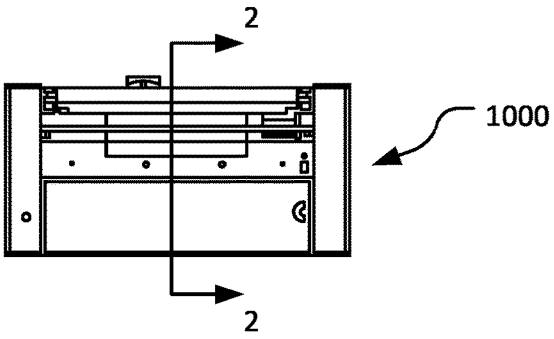
FIG. 1E is a back view of the duplex printer of FIG. 1A.

Printers and applicators for printing and applying labels (e.g., shipping labels, return labels, product labels, etc.) are known in the art. A conventional label printer may print indicia (e.g., text, images, shipping information, packing list information, etc.) on one or both sides of a label before depositing the label into a pickup area. There, the label may be collected by a user or by a label application machine, such as an arm with a vacuum charged tamp head. Traditionally, labels that are used with these printers must have their liners either removed after being printed (e.g., by a user or machine after the label has been deposited into the pickup area), or prior to being fed through the printer. In the latter case, modifications are made to parts of the standard printer to prevent undesirable adhesion of the label to these printer parts. These modifications may be, for example, one or more nonstick coatings which may be applied to the parts of the printer which contact the label. Furthermore, label liners removed from these labels must be dealt with to preclude these liners from jamming or otherwise reducing the efficacy of the printer system. Effectuating these changes may be time consuming, expensive, and/or impractical for prior art printers.

One issue with the traditional printer is that undertaking single printing (i.e., printing one label at a time, as opposed to multiple labels consecutively), may be laborious and inefficient. Typically, the single printing process consists of the printer receiving the necessary printing information, feeding a label through the printer, printing indicia on the label, and depositing the printed label into the pickup area. However, depositing the printed label into the pickup area is not as simple as it may seem. In cases where the printed label is to be collected by an automated or otherwise mechanical arm, the printed label must be placed very carefully. Deviations from the standard label pickup area may result in the arm not being able to properly collect the label and/or not being able to properly apply the label. Tolerances in these situations may be plus or minus several millimeters, and traditional printers may have difficulty keeping up with these strict parameters.

Limitations in arm operation and/or placement impose other restrictions on the printer, especially during single printing. For example, the arm may require a certain amount of clearance from the printer to pick up the printed label unimpeded. Thus, the label must be deposited in a pickup area that is arranged some distance from a printer mouth or housing. This pickup area spacing may adversely affect printing, such as by forcing the printer to feed a second label at least partially through the printer to properly place the first label into the pickup area. During single printing, for instance, the printer must be reset (e.g., by continuing to feed through the blank second label, rewinding the label roll, manually resetting through a user, etc.) to begin another print job. This may hold true for what is referred to herein as "multi-printing" (i.e., where a print job involves printing two or more labels consecutively).

It may be inefficient to have to wait to start printing the next label until after the label or label roll is reset within the printer (which may be referred to herein, as a "wait time" or a "waiting time requirement"). The wait time is downtime which may reduce the number of labels that may be printed and applied to substrates in a period of time (e.g., every minute). Such downtime may be particularly undesirable because the process of printing and applying labels to substrates may be repeated a multitude (e.g., many thousands) of times every day. Elimination of this waiting time requirement may allow for additional labels to be printed and applied in a time period (e.g., each minute), and consequently, improve the efficiencies of the label printing and application process and reduce the costs associated therewith. Furthermore, the tight label movement/drop-off tolerances conventional printers must abide by may be overburdened by excessive label movement that occurs during label resetting. Embodiments of the present disclosure may relate to printing, label making, and applying apparatus that mitigates the waiting time requirement when undertaking single printing.

Figure 2:
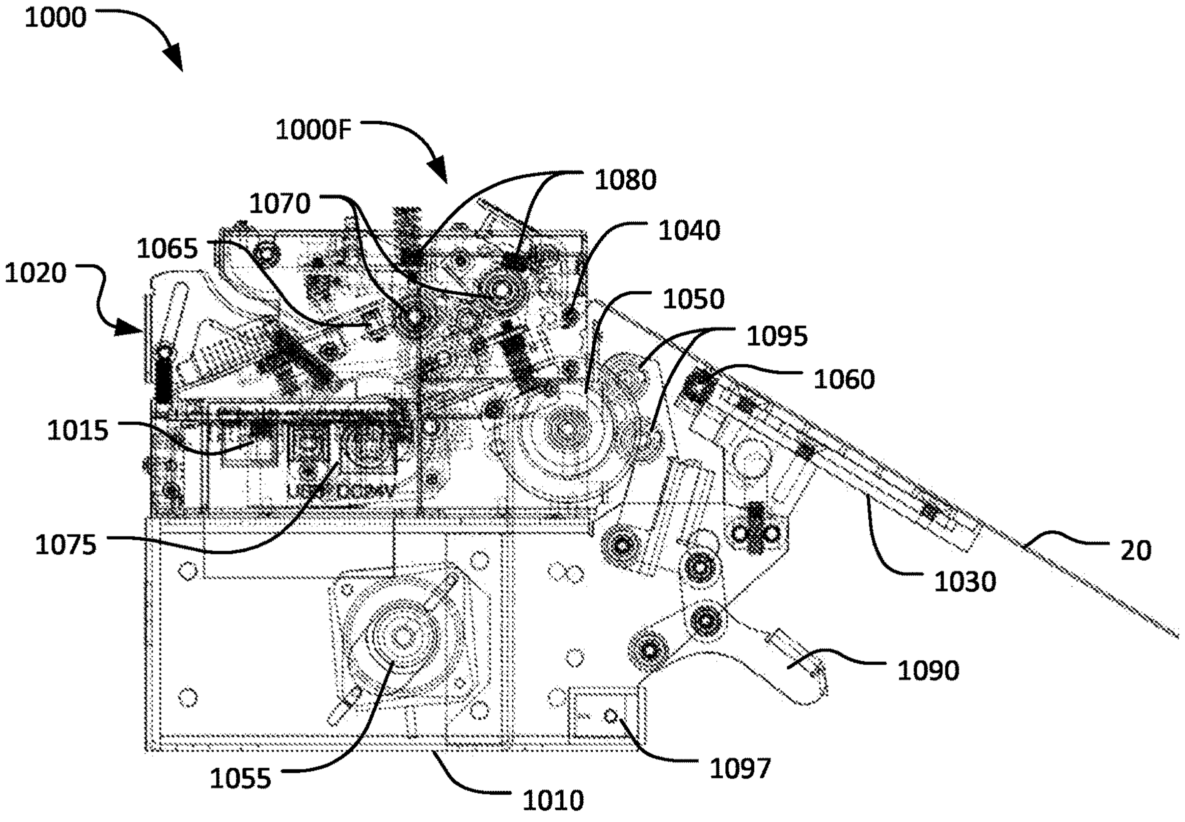
FIG. 2 is a section view of the duplex printer of FIG. 1E, in an embodiment.

FIGS. 1A-1E depict an embodiment 1000 of a duplex printer for performing duplex printing (i.e., printing on both sides of a label). FIG. 2 shows a section view of the printer 1000 detailing internals of the printer 1000, in an embodiment. The size, shape, and parts shown in FIGS. 1A-1E and 2 are merely exemplary, and may be readily scaled, adjusted, and/or modified as is suitable. The duplex printer 1000 may be a retrofitted printer configured to perform the functions described herein in some embodiments, and in other embodiments, may be newly manufactured according to the teachings herein. The embodiment depicted in FIGS. 1A-1E may be based on a modified Rekon Duo™ printer that is capable of handling labels 8.5 inches wide, yet other embodiments contemplated herein may include other suitable types and sizes of printers. The printer 1000 may be configured such that both sides of the media are printed using the same printing technology (e.g., both the front and back sides may be printed using inkjet printing, laser printing, direct thermal printing, thermal transfer printing, et cetera). Alternately, both sides of the media may be printed using different printing technologies (e.g., one side of a paper may be printed using laser printing technology and the other side thereof may be printed using thermal printing; or, for instance, the two sides of the media may be printed using laser printing and thermal transfer printing, or thermal printing and thermal transfer printing, and so on).

Figure 17:
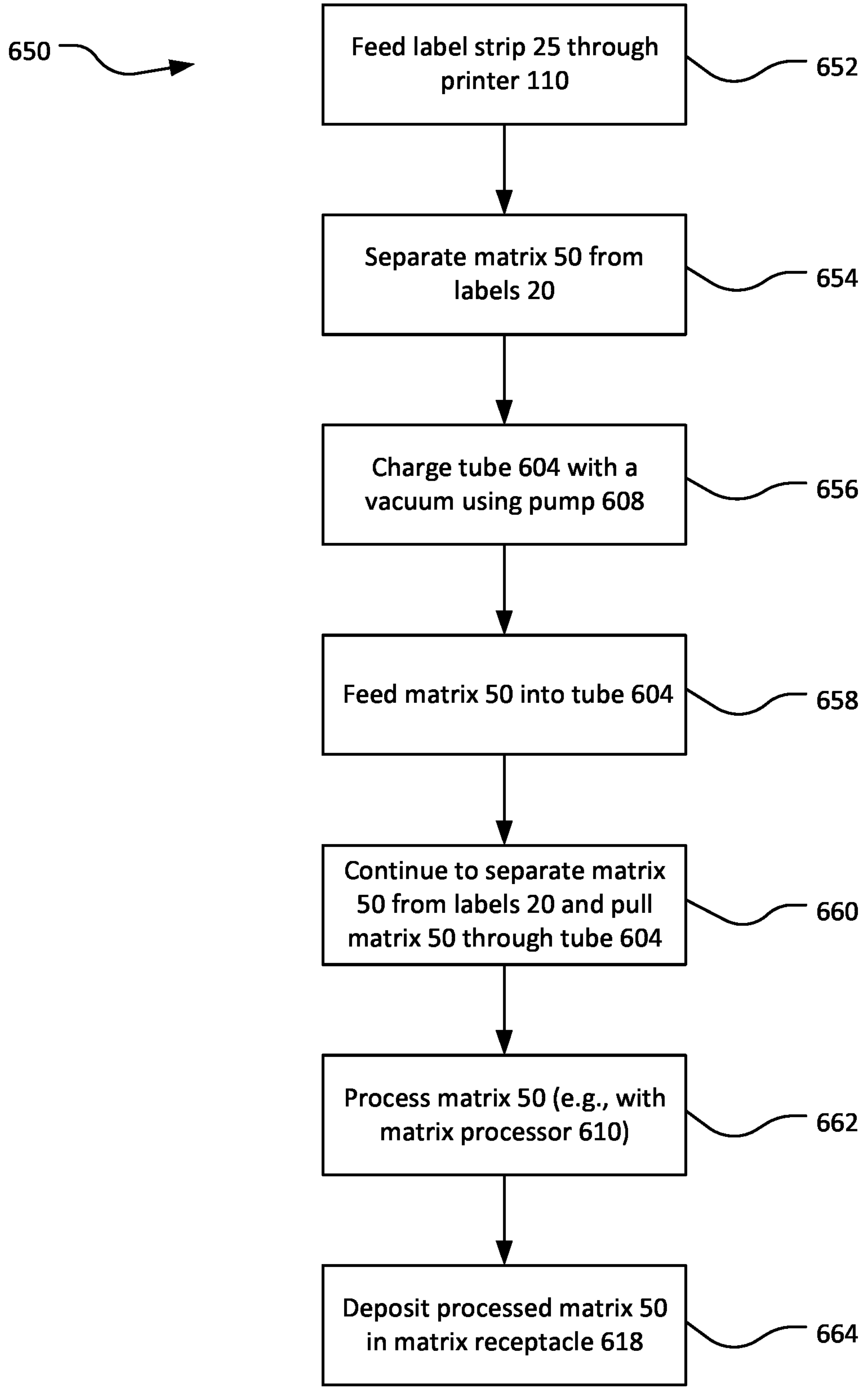
FIG. 17 is a flowchart illustrating a method of operating the matrix peel assist system of FIG. 15.
Figure 18:
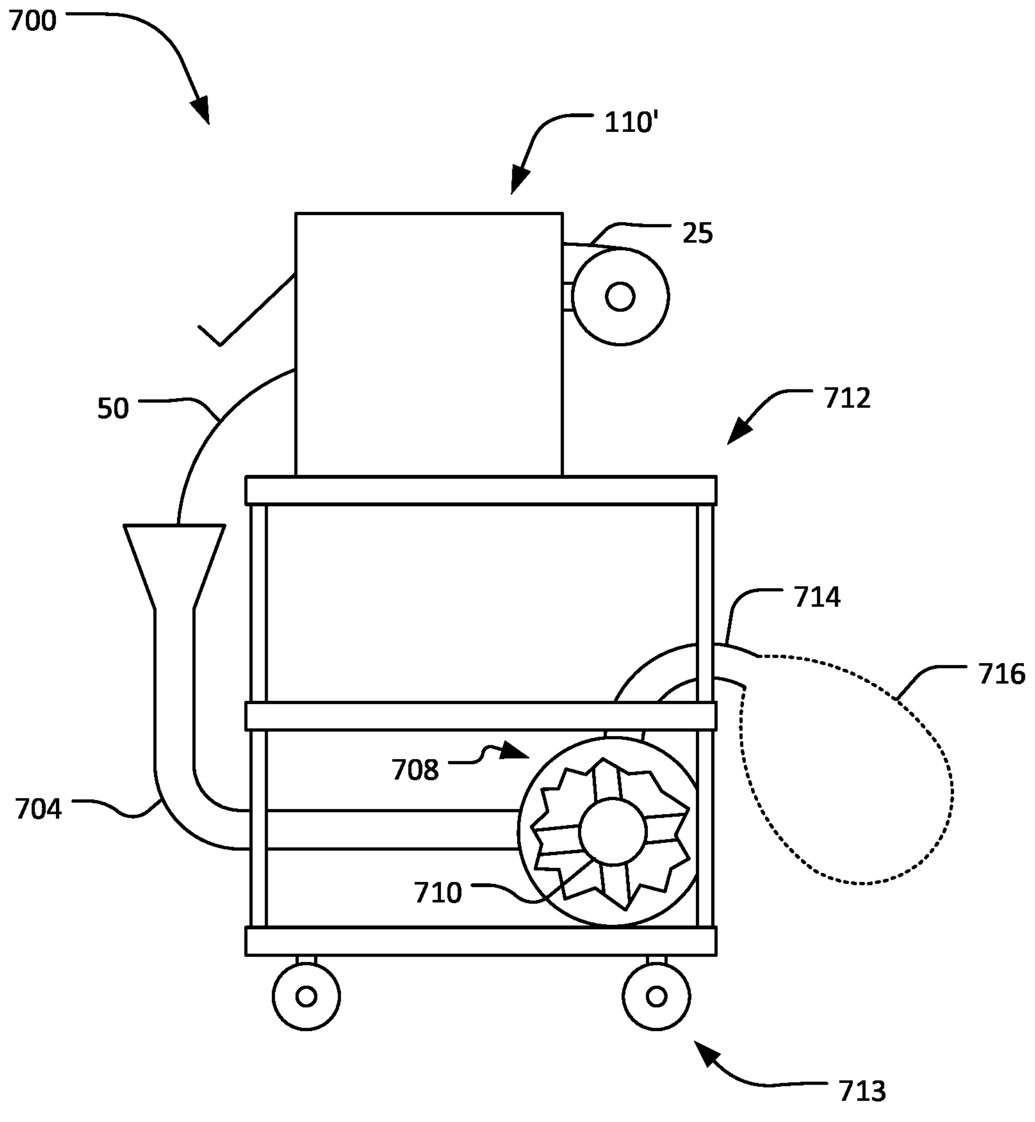
FIG. 18 is a side view of a label printing and apply system on a mobile cart, according to still another embodiment of the disclosure.

In operation, the duplex printer 1000 may remove a liner or liner matrix associated with the labels during the label printing process. That is to say, the duplex printer 1000 may peel or otherwise disassociate a liner/liner matrix from one or more labels relatively at the same time, slightly before, or slightly after the one or more labels have received indicia from the duplex printer 1000. The duplex printer 1000 may deposit the newly printed label in a pickup area or tray, such as a vacuum charged plate. There, the printed label may await collection from an automated (or other type) arm. In other embodiments, the removed liner or liner matrix may be carried away through a vacuum charged tube. The artisan would understand the duplex printer 1000 and its embodiments may be incorporated or employed with any of the other label printing and applying embodiments described herein, such as the labeling apparatuses 100 (FIG. 3) and 800 (FIG. 19), the computing system 160 (FIG. 13), the matric peel assist systems 600 (FIG. 15) and 700 (FIG. 18), and/or the methods 140 (FIG. 7), 250 (FIG. 8), 500 (FIG. 14), and 650 (FIG. 17). In embodiments, any other suitable printer described herein (e.g., the printer 112, the printer 110') may be replaced with the duplex printer 1000. In embodiments, the duplex printer 1000 uses direct thermal printing, but the artisan would understand that the duplex printer 1000 may be readily adapted for any suitable type of printing, such as thermal transfer, laser, or inkjet printing. As an example, the printer 1000 may have an upper and a lower print head 1080 that are both configured for direct thermal printing. As another example, the printer 1000 may have one print head 1080 that is configured for direct thermal printing, and another print head 1080 that is configured for thermal transfer printing.

The duplex printer 1000 may comprise a printer housing 1010, a label feed tray 1020, a pickup area 1030, a peel bar 1040, a driven roller 1050, one or more pause sensors 1060, one or more label rollers 1070 (FIG. 2), and a plurality of print heads 1080 (FIG. 2), along with any other suitable part that may be included in a printer (e.g., rollers, tools to exploit perforations, et cetera). The printer 1000 may further comprise, as shown in FIG. 2, a print roller motor 1075 for actuating the rollers 1070, and a driven roller motor 1055 for actuating the driven roller 1050. In some embodiments, the printer 1000 may further comprise a computer readable medium 1015 having software to effectuate some of the functions of the printer 1000. In operation, the duplex printer 1000 may take in one or more labels 20 (FIG. 2, FIG. 3) or label strips 25 (FIG. 16) via the label tray 1020, print on these labels 20, 25, separate a liner or liner matrix 50 from the labels 20, 25, and then deposit the printed labels 20, 25 onto the pickup area 1030 for collection. The pickup area 1030 may facilitate holding the printed label in place until the label is collected, such as through a lip or through a vacuum charge, for example.

The liner matrix 50 may be removed from the rest of the labels 20, 25 via the peel bar 1040 and the driven roller 1050. The peel bar 1040 may extend from the printer housing 1010 in a manner that allows the labels 20, 25 exiting the printer housing 1010 to engage therewith. The peel bar 1040 may then contact and separate the liner 50 from the labels 20, 25, while the driven roller 1050 facilitates this process by pulling the liner 50 in a direction (e.g., a direction that is different than a direction of travel of the labels 20, 25). The roller 1050 may be driven by, for example, a stepper motor that is configured to apply a force (e.g., though rotational speed, gear ratio, and/or roller 1050 size) to the liner 50 such that the liner 50 travels at a speed disparate from the speed at which the labels 20, 25 travel through the printer 1000. This may result in a roller 1050 that "pulls" the liner 50 and the other upstream liners away from the labels 20, 25. Having a roller 1050 that applies such a pulling force on the liner 50 and the upstream liners may ensure the liners remains in tension and may eliminate or at least mitigate instances where the liners jam the printer 1000 by ensuring swift removal of the liner 50 from the remainder of the labels 20, 25. In embodiments, the driven roller 1050 rotates at a speed that is approximately 2% to 7% faster than a speed of the label-moving roller 1070 (e.g., a motor or rotor thereof). The resulting liner matrix 50 being routed from the duplex printer 1000 may be processed by a matrix peel assist system, such as embodiments 600 and 700 discussed further herein.

To facilitate the driven roller 1050 operation, the printer 1000 may further comprise a nip lever arm 1090 operably coupled to one or more nip rollers 1095. The nip rollers 1095 may be configured to press the liner matrix 50 against the driven roller 1050 during printer 1000 operation. In doing so, the driven roller 1050 may more effectively engage with the matrix 50 and pull the matrix 50 from the labels 20. The nip lever arm 1090 and its associated nip rollers 1095 may be configured to be adjustable such that the position of the nip rollers 1095 may be changed. For instance, a user may operate the lever arm 1090 to push and/or pull the nip rollers 1095, bringing the nip rollers 1095 closer to or further away from the driven roller 1050. Adjusting the position of the nip rollers 1095 may modify the force at which the nip rollers 1095 press an intervening matrix 50 to the driven roller 1050. In embodiments, the nip rollers 1095 may be moved a distance away from the driven roller 1050 with the lever arm 1090 to create space for the clearance of matrix 50 jams. In still more embodiments, the lever arm 1090 may be used to disengage the nip rollers 1095 from the driven roller 1050 to provide access for a user to manually feed the beginning of a matrix 50 to the driven roller 1050. Afterwards, the user may operate the lever arm 1090 to sandwich the matrix 50 between the nip rollers 1095 and the driven roller 1050, whereafter the printer 1000 may divert the matrix 50 from the labels 20 autonomously.

When a label of a label roll is printed and deposited in the pickup tray 1030, a portion of the subsequent (second) label will follow the printed label outside the printer 1000. The printer 1000 will then need to be rewound to reset the second label so that the second label can be printed (e.g., the label 20 may be rewound up to two inches, the label 20 may be rewound one-and-nine-sixteenths of an inch, the label 20 may be backed up one-and-three-quarters of an inch, et cetera). Because the print heads 1080 may all be, in embodiments, located in a forward section 1000F of the printer 1000, the labels 20, 25 may not have to be backed up too far. The roll back distance of the printer 1000 may be shorter than other printers having their print heads located further back in the printer. Because the peel bar 1040 may be located near a print head 1080 of the duplex printer 1000, there may be a discrepancy between how much the liner 50 and labels 20, 25 back up when the duplex printer 1000 rewinds or backs up to reset the second label and put it in a position to be readily printed upon. That is to say, the liner 50 may back up a distance that is less than a distance the labels 20, 25 back up, to preclude the liner 50 from jamming the duplex printer 1000. Such may ensure the liner stays taut and does not jam up the printer 1000 during the backing-up operation.

The pause sensors 1060 may facilitate duplex printer 1000 operation. Specifically, the pause sensors 1060 may be one or more sensors configured to detect a presence, a gap, hole, and/or mark (e.g., a 3 millimeter mark) of the labels 20, 25 in the label tray 1030 vicinity. Upon label 20, 25 detection, the duplex printer 1000 system may respond by halting the movement and/or printing of the labels 20, 25. The sensor 1060 detections may also be used to initiate movement of the labels 20, 25. To illustrate an example, the sensors 1060 may detect the presence of a label 20, 25 being deposited into the pickup area 1030 and signal the duplex printer 1000 to halt the label 20, 25 movement. A user or automated arm may collect the deposited label, thus removing the label 20, 25 from sensor 1060 detection. This may trigger the duplex printer 1000 to resume movement and/or printing of the labels 20, 25 (e.g., resume backing up the labels 20, 25 and/or moving the labels 20, 25 forward).

Some commercial printers comprise a button/switch as part of a pause circuit which serves to halt label printing when actuated. In embodiments where such a commercial printer is retrofitted according to the printer 1000 disclosed herein, the pause sensor 1060 may be tied into the pre-existing pause circuit. Alternatively, in embodiments where such a button/switch is not present in the printer 1000, the pause sensor may instead be directly linked with a print circuit of the printer 1000 such that sensor detections made by the pause sensor 1060 may halt/start printing of the labels 20, 25.

The sensors 1060 may facilitate single printing and/or multi-printing modes of the duplex printer 1000. For example, during printing, a pause sensor 1060 located adjacent the pickup area 1030 may be used to detect when the printed label is deposited therein. In embodiments, the printer 1000 may further comprise one or more print sensors 1065 configured to detect a presence and/or alignment of the labels 20, 25. The print sensor 1065 may be, for example, a gap, hole, and/or I-mark sensor for detecting an indicator on the label 20, 25. The print sensor 1065 may be located near a print head 1080 of the duplex printer 1000, and may be used to detect when the next label to be printed has been properly aligned. Aligning the second or subsequent label during printing may involve backing up or rewinding or resetting the labels 20, 25 back to a starting print position. This may be necessary because pushing out the previously printed label 20, 25 into the pickup area 1030 will cause the labels 20, 25 behind it to travel through the printer housing 1010 without being printed upon. Thus, the duplex printer 1000 may cause the labels 20, 25 to travel backwards until the next label 20, 25 is ready to be printed upon. Once the next print job is received, the label 20, 25 may travel though the duplex printer 1000 as normal. The print sensors 1065 may be used to determine when the label 20, 25 has reached the print-ready position after rolling back or rewinding.

The pause sensors 1060 may be configured to alternately or additionally provide the function of checking the label 20, 25 alignment during and/or after the printing process. The pause sensors 1060 may detect, for instance, that a printed label 20 has been incorrectly placed in the pickup area 1030. In response to this detection, the duplex printer 1000 may move the printed label 20 forwards, backwards, and/or side to side as much as needed to correct its positioning. The label 20 may move up to, for example, +/−seven-and-a-half millimeters in each of these directions. In a preferred embodiment, the printer 1000 may be configured to move the label 20 in up to +/−four millimeters in each of these directions. In embodiments, these corrections to the position of the label 20 may be made by the driven roller 1050 and/or the label roller 1070. That is, the roller(s) 1050, 1070 may move the label 20 backwards or forwards to correct label 20 position. In still more embodiments, the driven roller 1050 and/or the label roller 1070 may be configured to move side-to-side, in addition to backwards and forwards, to correct the position of the label 20. This may be accomplished through, for example, servos or motors which displace the roller(s) 1050, 1070 left and/or right. In still further embodiments, this side-to-side adjustment of the labels 20 may be accomplished by angling the roller(s) 1050, 1070 left and/or right. Alternately or additionally, the printer 1000 may be configured to correct for a misaligned label 20 by adjusting placement of printed indicia on the label 20. In these cases, the printer 1000 may adjust a position of the print head 1080 (e.g., via servos and/or motors) to change where the printer 1000 imparts printed matter on the labels 20. Alternatively, in embodiments, the printer 1000 may comprise software which adjusts the operation of the print heads 1080 to change where the printer 1000 imparts printed matter on the labels 20 and/or to align printed matter to the labels 20. In still more embodiments, the printer 1000 may be configured for full edge-to-edge repositioning of the printed matter on the label 20 (i.e., along a full width and a full length of the label 20).

In embodiments, alternatively or additionally to the adjustability function described above, the printer 1000 may be configured to adjust a position of the labels 20, 25 prior to their engagement with the peel bar 1040 after exiting the printer housing 1010. For instance, the printer 1000 may be configured to adjust the position of a label 20, which has begun to exit the printer housing 1010, by at least +/−two millimeters. In embodiments, the position of the label 20 may be adjusted up to +/−ten millimeters. In still more embodiments, the position of the label 20 may be adjusted up to +/−seven-and-a-half millimeters. In yet more embodiments, the position of the label 20 may be adjusted up to +/−four millimeters. This adjustability may facilitate the use of different label 20, 25 types and sizes with the peel bar 1040. For example, a set of labels 20, 25 having a gap or spacing between each label may require a greater adjustment before engaging the peel bar 1040, relative to a set of labels 20, 25 which are contiguous (i.e., having no gap or spacing between individual labels).

While performing multi-printing, the duplex printer 1000 may be configured to at least partially begin printing of the next label 20 before the previously printed label has been collected or deposited in the pickup area 1030. For instance, in an example configuration, the duplex printer 1000 may print about two inches or just above five centimeters of the next label 20 before the pause sensors 1060 halt the movement of the labels 20, 25. After the fully printed label 20 in the pickup area 1030 has been collected, the duplex printer 1000 may resume printing the remaining amount of next label 20. This feature may provide an improvement upon conventional printers since the duplex printer 1000 may efficiently continue printing the next label 20 even though the previously printed label 20 has not been picked up yet. Furthermore, the location and arrangement of the sensor 1060 and pickup area 1030 are adjustable to suit various scenarios. For example, in situations where a larger clearance is needed between the pickup area 1030 and the printer housing 1010, the pause sensor 1060 may be located further away from the housing 1010 well, resulting in a larger percentage of the next label 20 being printed before the duplex printer 1000 halts printing and awaits label 20 pickup from the pickup tray 1030.

It is to be understood that the duplex printer 1000 may be configured to handle any suitable label design and/or orientation. For example, the duplex printer 1000 may be adapted to process and print labels along their width rather than their length. This may have the benefit of being able to process a higher number of labels in a given time period than a printer which processes the same sized label lengthwise. To illustrate an example, a label eight-and-half inches long and five inches wide may be processed through the printer widthwise, causing the label to have to travel three-and-a-half inches less through the printer 1000 compared to moving through length-wise. To facilitate this and other functions, the printer 1000 may, in embodiments, be able to rotate its print heads 1080. Alternatively or additionally, software of the computer-readable medium 1015 may be configured to modify and reorient the print head 1080 output (e.g., by providing the print heads 1080 with instructions). Changing the function of the print heads 1080 in this manner may allow for the printing of indicia at different angles (e.g., at ninety degrees, one-hundred-eighty degrees, two-hundred-seventy degrees, et cetera). For instance, software of the computer-readable medium 1015 may reorient the output of the print heads 1080 by ninety degrees when the labels 20, 25 are run through the printer 1000 sideways so as to allow the resulting printed indicia to be oriented correctly. In embodiments, the software of the computer-readable medium 1015 may automatically provide instructions to change the output of the print heads 1080 based on a feed orientation of the labels 20, 25 (e.g., via a print sensor 1065 detection thereof). In embodiments, the printer 1000 may have an adjustable print speed (e.g., a print speed that ranges between four and eight inches per second).

In embodiments, the duplex printer 1000 may have other features such as a function toggle 1097 that may be triggered by a user to halt printing. The user may then perform whatever task is required (e.g., unjamming a label from the duplex printer 1000, opening up the printer 1000 to load more labels 20, 25, etc.), and resume normal operations by triggering the toggle again. The duplex printer 1000 may retain its computer memory of the current print job when the function toggle is used, unlike conventional printers which may lose this memory when having to undergo similar tasks.

Thus, embodiments of a duplex printer having a liner peel system and pause sensors is described herein. An advantage of the duplex printer 1000 may be that single printing may be more efficient (e.g., faster, more precise) than conventional single printing. Another advantage of the duplex printer 1000 may be that multi-printing may be performed more efficiently than with conventional printers, since the pause sensors 1060 may facilitate the adjustment of the labels running through the duplex printer 1000, while enabling the duplex printer 1000 to begin printing of another label before the previously printed label has been delivered to the pickup area 1030 or before the previously printed label has been collected. It is to be understood that the duplex printer 1000 described above may be adapted for use with any of the following label printing and applying embodiments described. For example, the matric peel assists system 600 (FIG. 15) and/or 700 (FIG. 18) may be used to process the liner 50, the automated arm 120 (FIG. 3) may be used to collect printed labels 20 in the pickup area 1030, et cetera. The artisan would understand that while undergoing multi-printing or batch printing, the printer 1000 may be configured to print upon and/or process any suitable number of labels 20.

FIGS. 3 through 6 show a label making and applying system embodiment 100 (also referred to herein as the "labeling apparatus"). The labeling apparatus 100 may be used to print labels 20, and may, in embodiments, include a staging area 110, an automated or semi-automated arm 120, and a tamp head 130. The labeling apparatus 100 may also have associated therewith means (e.g., a conveyer belt) to allow for one or more substrates (e.g., a carboard or other box, a surface, a ply, clothing, packaging, etc.) to be successively placed at a location where a label (e.g., a label 20) may be adhered thereto by the apparatus 100. In embodiments, the labeling apparatus 100 may make use of a computing system 160 (FIG. 13) to perform the functions described herein.

Figure 4:
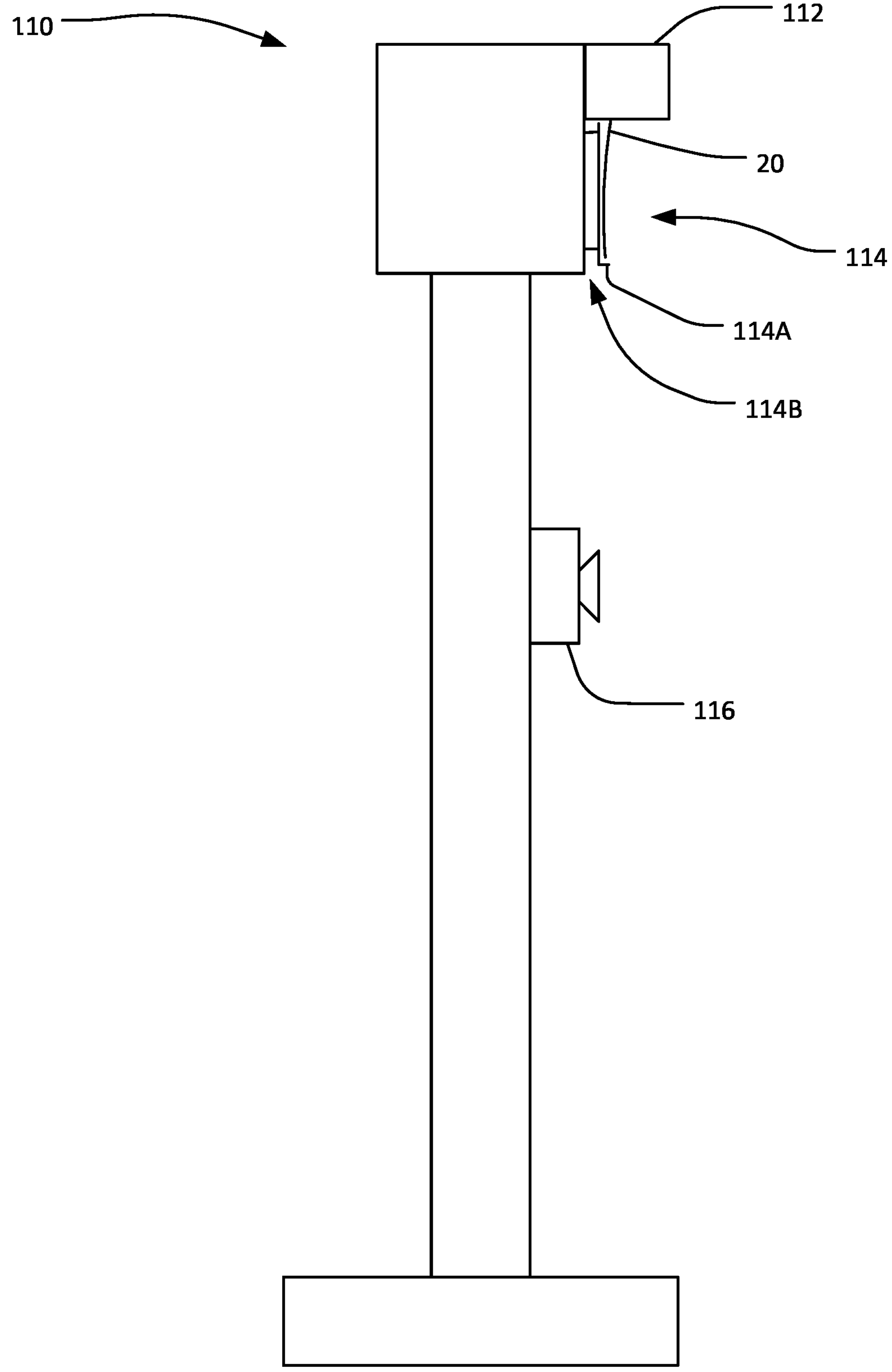
FIG. 4 is a side view of a staging area of the label printing and applying system of FIG. 3.

As seen in FIG. 4, the staging area 110 may in embodiments comprise a printer 112 and a holding tray 114. The printer 112 may be any printer now known or subsequently developed (e.g., a laser printer, an inkjet printer, a direct thermal printer, a thermal transfer printer, a commercial printer, a handheld printer, etc.) for suitably printing the label 20, and may be configured to print indicia (e.g., personalized and/or generic indicia, color and/or black and white indicia, etc.) thereon. The holding tray 114 may be configured to hold labels, e.g., a label 20, during the printing process and/or after the label 20 has been printed by the printer 112 (e.g., until the tamp head 130 returns to its original position after applying the preceding label, as discussed herein). The printer 112 may print relevant indicia (e.g., packaging information, shipping information, marketing materials, etc.) on the label 20, and deposit the label 20 in the holding tray 114. In an embodiment, the printer 112 may begin the printing of an additional label 20 as soon as the preceding label 20 is removed from the holding tray 114. In another embodiment, the printer 112 may begin printing the next label 20 within one, two, three, or four seconds of the removal of the dissolving label 20 from the tray 114.

The holding tray 114 may be a receptacle (e.g., a plate, bin, tub, tray, etc.) configured to receive and hold the labels 20 processed by the printer 112 for the tamp head 130. The holding tray 114 may, in embodiments, extend generally vertically. In embodiments, the holding tray 114 may have a lip or one or more protruding edges 114A (which may extend generally laterally or otherwise be perpendicular to the vertically extending portion of the holding tray 114) to aid in holding the label 20 within the holding tray 114 after the label 20 has been printed by the printer 112. In other embodiments, the holding tray 114 may have a textured plasma or other coating configured to inhibit the labels 20 from undesirably adhering to the holding tray 114.

Alternately or additionally to the lip 114A, the holding tray 114 may, in embodiments, be charged with a vacuum to hold the label 20 within it. For example, the holding tray 114 may include a vacuum plate 114B configured to selectively retain the label 20 with an applied vacuum. The vacuum plate 114B may, for example, apply the vacuum constantly, intermittently (e.g., at timed intervals that are in synchronization with a printing cycle of the printer 112), manually, and/or automatically. The vacuum plate 114B may automatically apply the vacuum in response to, for example, a sensor (e.g., a sensor 128) detection of the printed label 20. As another example, the vacuum plate 114B may automatically apply the vacuum in response to a signal from the printer 112 indicating that that the printing of the label 20 is (or is about) complete and the label will be deposited within the holding tray 114.

To allow the label 20 to be collected by the automated arm 120, the vacuum plate 114B may cease operation and release the label 20 from the vacuum plate 114B vacuum. Similar to the methods of applying the vacuum described above, the label 20 may be released from the vacuum plate 114B intermittently (e.g., at timed intervals that are in synchronization with a collection cycle of the automated arm 120), manually, and/or automatically. The vacuum plate 114B may automatically release the label 20 in response to, for example, a sensor (e.g., a sensor 128) detection that the automated arm 120 is ready, or is about ready, to collect the label 20. As another example, the vacuum plate 114B may automatically release the label in response to a signal from the automated arm 120 indicating that the automated arm is prepared to collect the label 20. In some embodiments, the vacuum plate 114B may apply a vacuum charge that is configured to be overpowered or otherwise replaced by another vacuum charge (e.g., by a vacuum charge of the tamp head 130, as will be discussed in greater detail below). That is to say, the vacuum plate 114B vacuum may be overridden by a vacuum from another source, and thus the other source may collect the label 20 form the holding tray 114.

Figure 3:
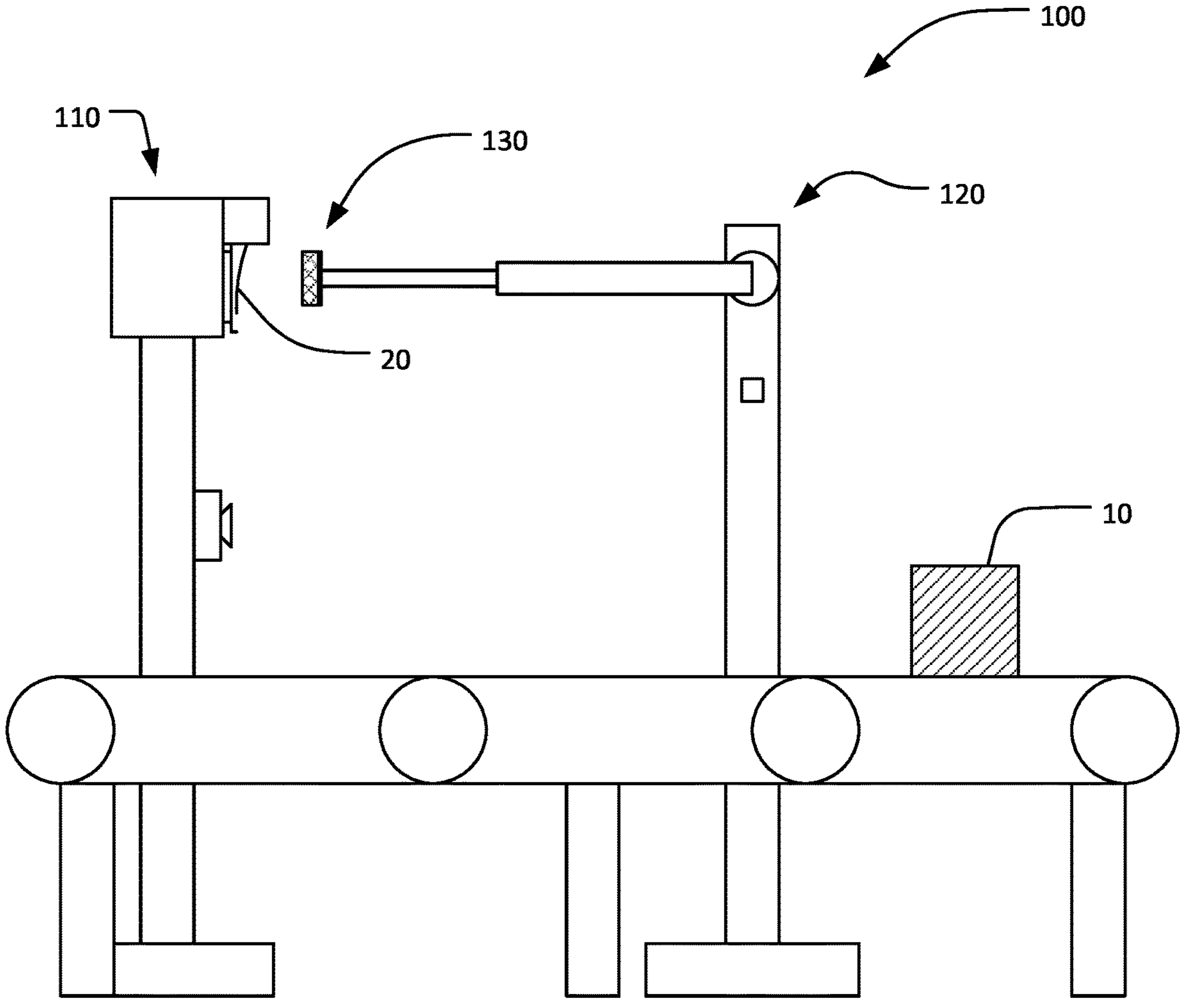
FIG. 3 is a side view of a label printing and applying system, according to another embodiment of the disclosure.

A label 20 having a dissolvable liner or a dissolvable adhesive liner may transition to the activated state (and thus be made ready for adherence to a surface) once said liner is brought into contact with a fluid. As such, the staging area 110 may, in embodiments, comprise a sprayer or other fluid dispensing means 116 downstream the printer 112, as shown in FIG. 3. In embodiments, the sprayer 116 may be downstream the holding tray 114. The sprayer 116 may be fluidly coupled to a tank for retaining fluid (e.g., water or other fluid for dispelling the dissolvable liner to expose the adhesive in case of the dissolvable liner label or for otherwise activating the dissolvable liner in case of the dissolvable adhesive liner label).

In embodiments, the sprayer 116 may spray the fluid onto the label 20, e.g., on the underside thereof, before the label 20 is adhered to the surface or substrate 10. Alternately or in addition, the sprayer 116 may be used to spray fluid onto the substrate 10 itself before the label 20 is brought in contact therewith. The fluid dispensing means 116 may, in embodiments, include a pump, a spray nozzle, valves, delivery conduits, etc., to allow for the fluid to be dispersed as desired (e.g., onto the underside of the printed label 20 as the printed label 20 travels from the holding tray 114 and comes adjacent the sprayer 116, onto the substrate 10 prior to the application of the label 20 thereto, etc.). The artisan will understand from the disclosure herein that liners other than the dissolvable liners may also, in embodiments, be employed with the label 20. Alternately, the label 20 may employ no liner (i.e., the label 20 may have an exposed adhesive layer) and the holding tray 114 may include a non-stick or other adhesion-resistant coating to preclude undue interaction between the exposed adhesive layer and the holding tray 114.

Figure 5:
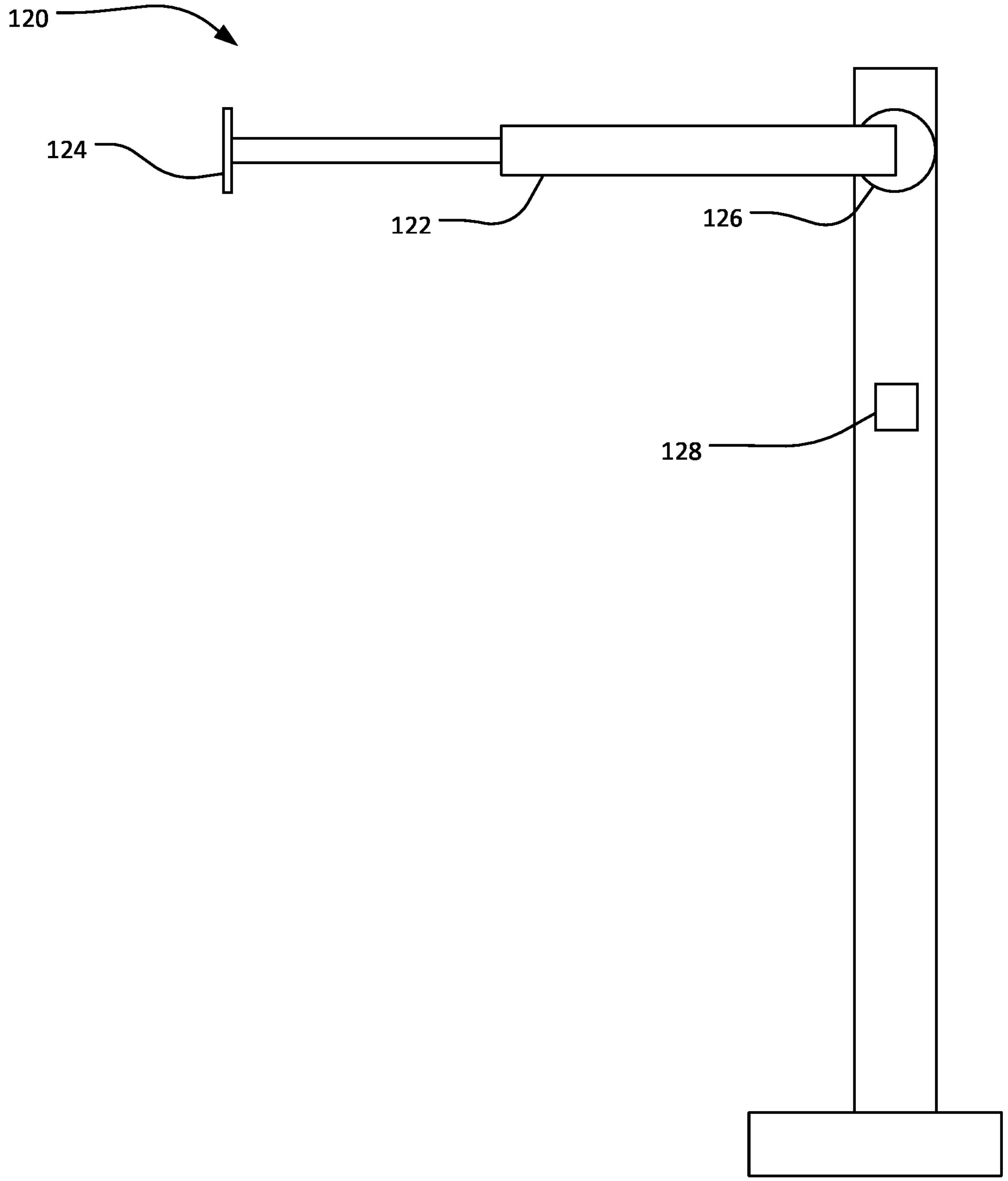
FIG. 5 is a side view of an automated arm of the label printing and applying system of FIG. 3.

The arm 120, as seen in FIG. 5, may comprise a plunger 122, a plate 124, a rotation device 126, and one or more sensors 128. The plunger 122 may be configured to be telescoping (or may otherwise be configured to selectively retract, extend, and/or otherwise adjust position), and may have a plate 124 attached to a distal end thereof. The plate 124 may be configured to hold the tamp head 130 (see FIG. 3), and may, in embodiments, comprise vacuum nozzles to charge the tamp head 130 with a vacuum. The rotation device 126 may be operably coupled to a proximal end of the plunger 122 and may be configured to cause the arm 120 to rotate (or otherwise move) such that the tamp head 130 pulls the printed label 20 from the tray 114 and eventually brings the label 20 in proximity with the substrate 10 for adhesion of the label 20 thereto. In embodiments, before the label 20 is applied to the substrate, the arm 120 may cause the label 20 to be brought proximate the sprayer 116 so that the sprayer may spray fluid on an underside of the label 20 to activate the dissolvable liner or the dissolvable adhesive liner. In other embodiments, the sprayer 116 may directly moisten the substrate 10 before the label 20 is brought into contact therewith by the arm 120. In such cases, the liner may activate when the liner is brought into contact with the wetted substrate 10.

One or more sensors 128 (e.g., LiDAR, infrared, etc.) may be used to detect the presence of the substrate 10, and aid in the process of applying a label 20 to the surface 10. That is, the arm 120 may move the tamp head 130 to the tray 114 for collection of a label 20, and then, using the sensors 128, move the tamp head 130 together with the label 20 to cause the tamp head 130 to adhere the label 20 to the substrate 10.

Importantly, printing of the next label 20 may advantageously begin as soon as the tamp head 130 removes the preceding label 20 from the tray 114, resulting in valuable time savings. That is, and as will become clear from the disclosure herein, the waiting time requirement of prior art label applicators may be eliminated or otherwise mitigated.

Figure 6:
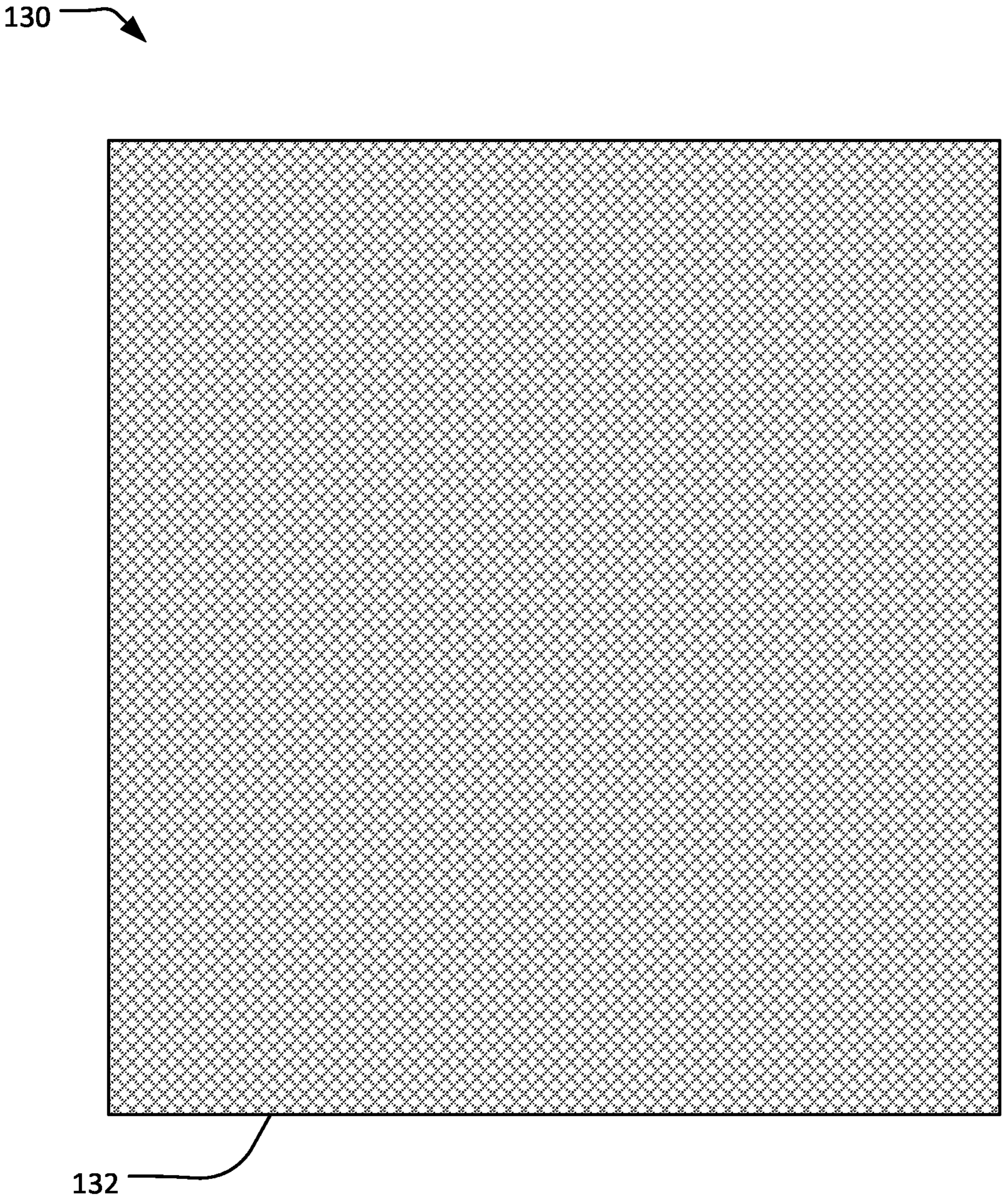
FIG. 6 is a close-up bottom view of a tamp head of the label applicator system of FIG. 3.

The tamp head 130, as seen in FIG. 6, may in embodiments comprise filter media 132 made of a compressible material which may be charged with a vacuum. For example, the filter media 132 may comprise a foam block about two inches thick, which easily allows air to pass through the block. The filter media 132 may be attached to the arm 120 via the plate 124. In operation, the vacuum charged filter media 132 may be used for the collection of a label 20 from the holding tray 114 and for the subsequent application of the label 20 to the substrate 10.

In embodiments, multiple apparatuses 100 may be provided, e.g., in line, to allow for various labels and associated documents to be printed and applied to the substrate 10 as the substrate 10 travels to the various apparatuses 100 on a conveyer belt. For instance, in embodiments, one labeling apparatus 100 may be used to print and apply to the substrate 10 the label 20, another downstream label applicator 100 may be used to print and apply to the substrate 10 a packing list (which may, e.g., be secured above the label 20), yet another downstream apparatus 100 may be used to adhere a coupon above the packing list, etc.

Figure 7:
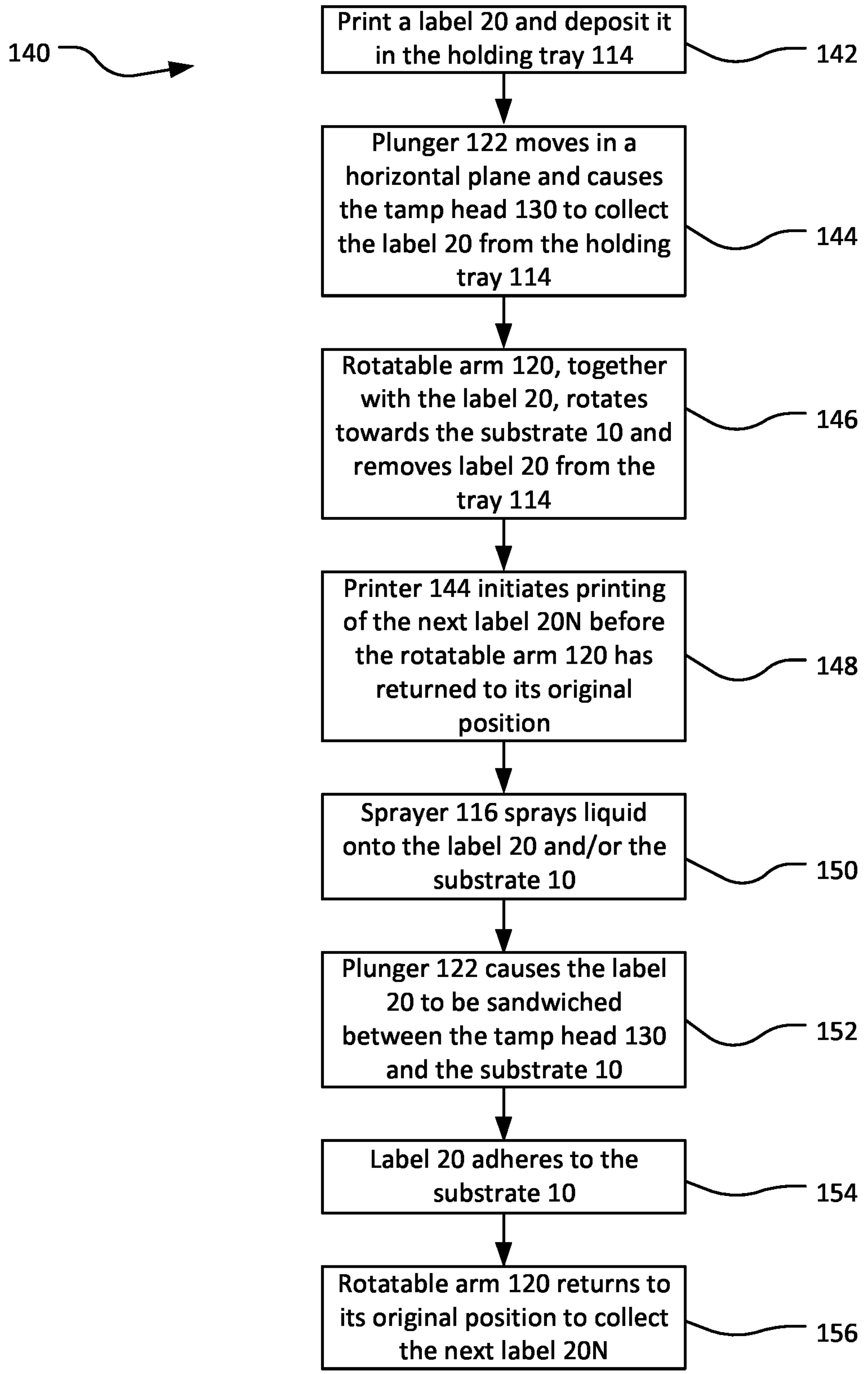
FIG. 7 is a flow chart illustrating a method for operating the label printing and applying system of FIG. 3, in an embodiment.
Figure 8:
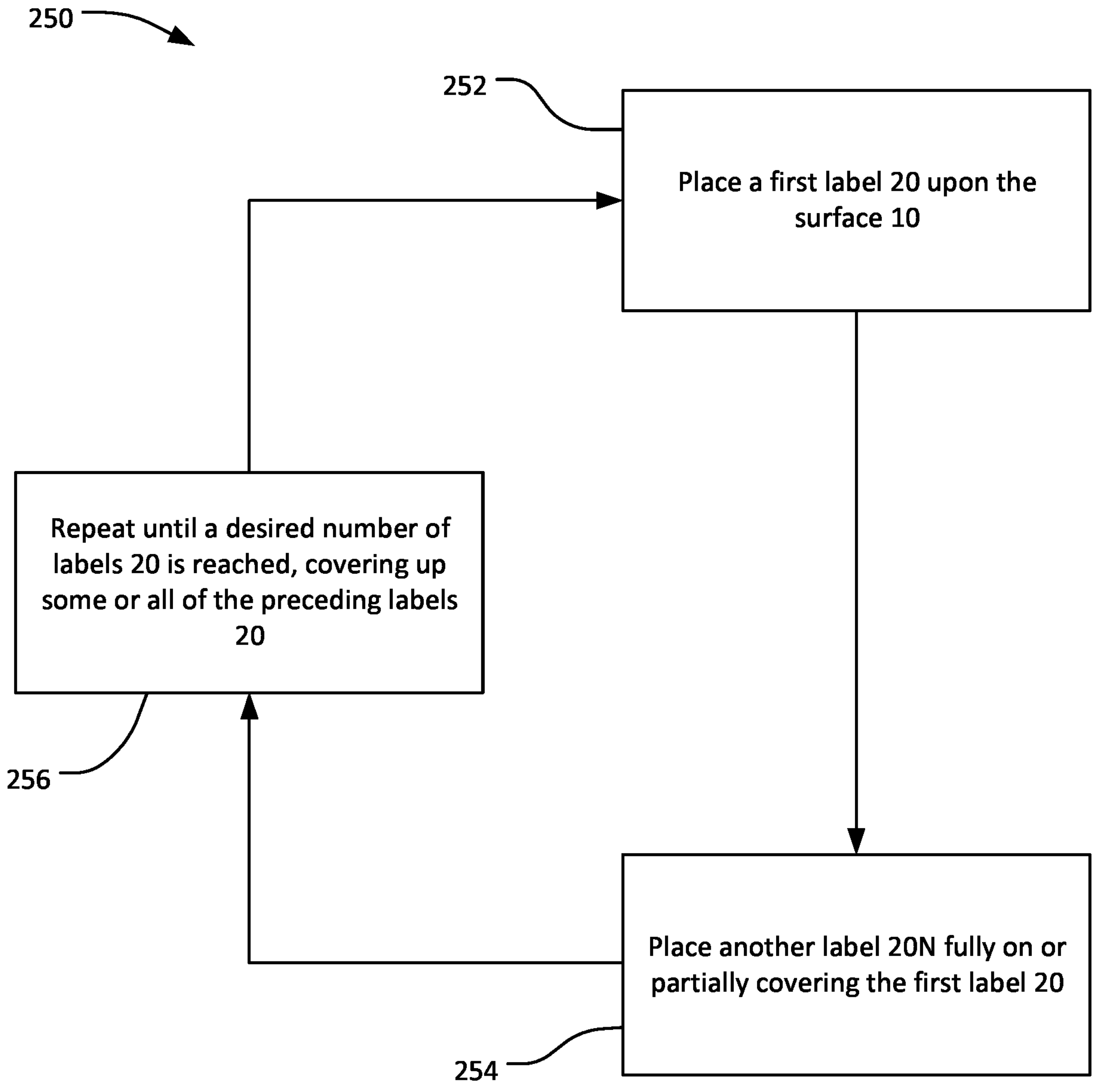
FIG. 8 is a flow chart illustrating a method for stacking labels applied using a plurality of label printing and applying systems of FIG. 3.

FIG. 7 is a flowchart depicting a method 140 of printing labels and applying these labels to substrates, in an example embodiment. First, at step 142, a label 20 may be printed using the printer 112 and deposited within the holding tray 114. For example, as discussed above, the label 20 may be held within the holding tray 114 using a laterally extending edge 114A, a vacuum, et cetera.

Figure 9:
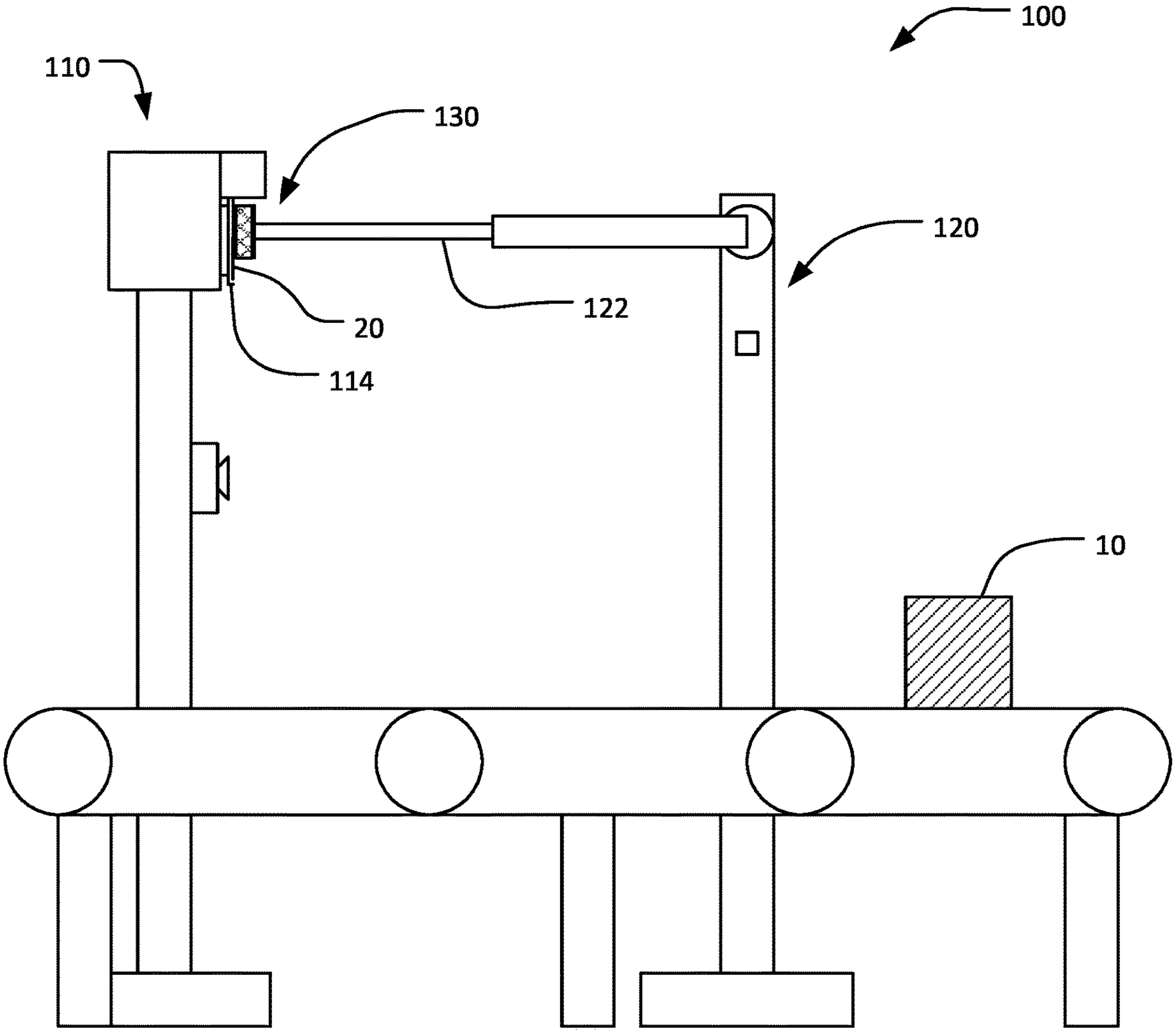
FIGS. 9-12 illustrate example operation of the label printing and applying system of FIG. 3, in an embodiment.

FIG. 3 shows the automated arm 120 in its initial or original position. At step 144, once the label 20 is printed and held in the holding tray 114 as shown in FIGS. 2-3, the automated arm 120 and/or a portion thereof may extend (e.g., horizontally) to an intermediate position. For example, the telescoping plunger 122 may telescope and/or otherwise extend in the horizontal plane to a first position such that the tamp head 130 contacts the label 20 being held in the holding tray 114 (see FIG. 9) for collection. Alternately, the plunger 122 may be brought proximate the label 20 in the holding tray 114 so that the label 20 adheres to the tamp head 130 by virtue of a vacuum.

At step 146, once the tamp head 130 has collected the label 20 from the holding tray 114, the rotatable arm 120 may rotate (towards the substrate 10 to another intermediate position) while the label 20 is secured to the tamp head 130 (e.g., via a vacuum), and resultantly, remove the label 20 from the tray 114. At step 148, as soon as the label 20 is removed from the tray 114, printing of the next label 20 by the printer 112 may be initiated.

Figure 10:
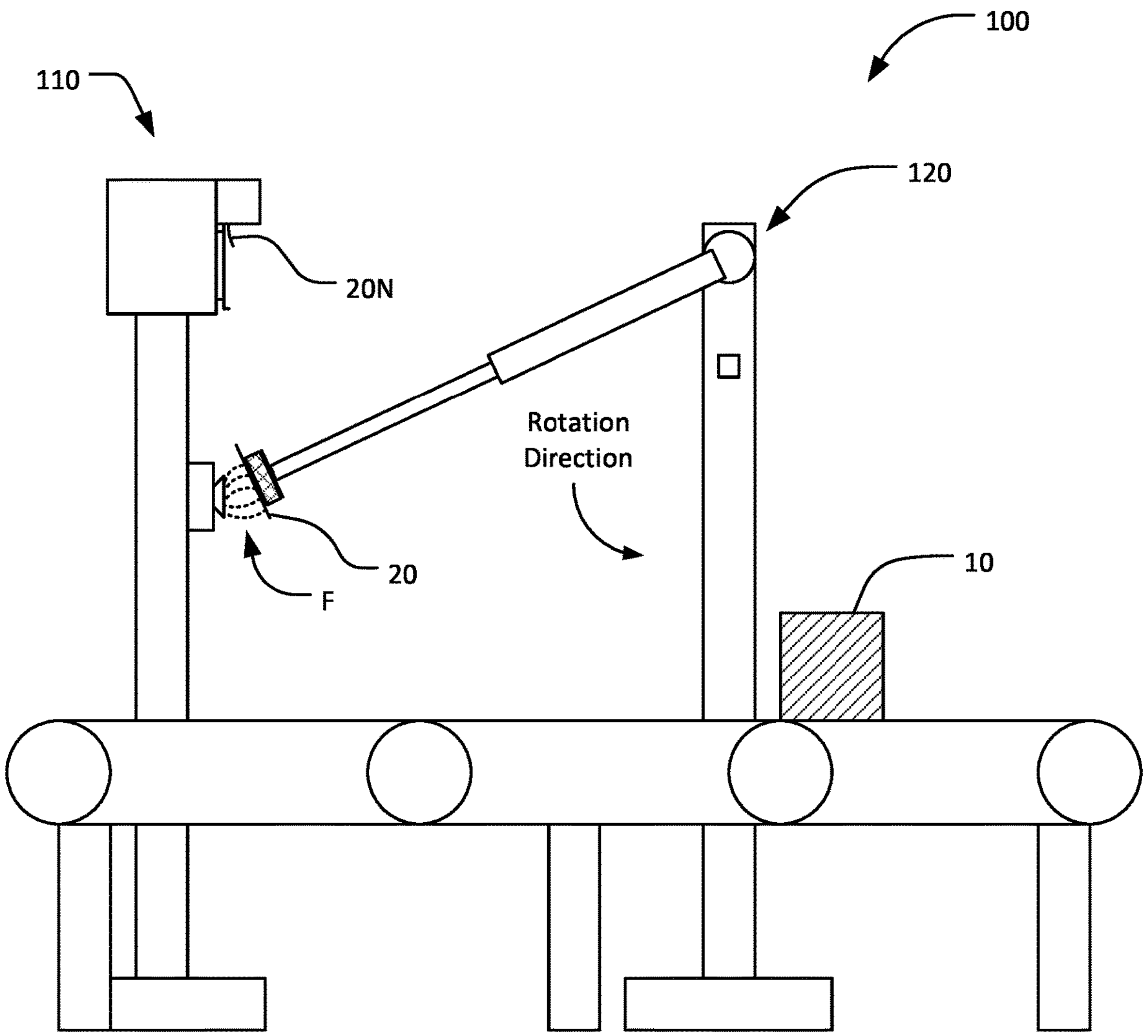
Figure 10A:
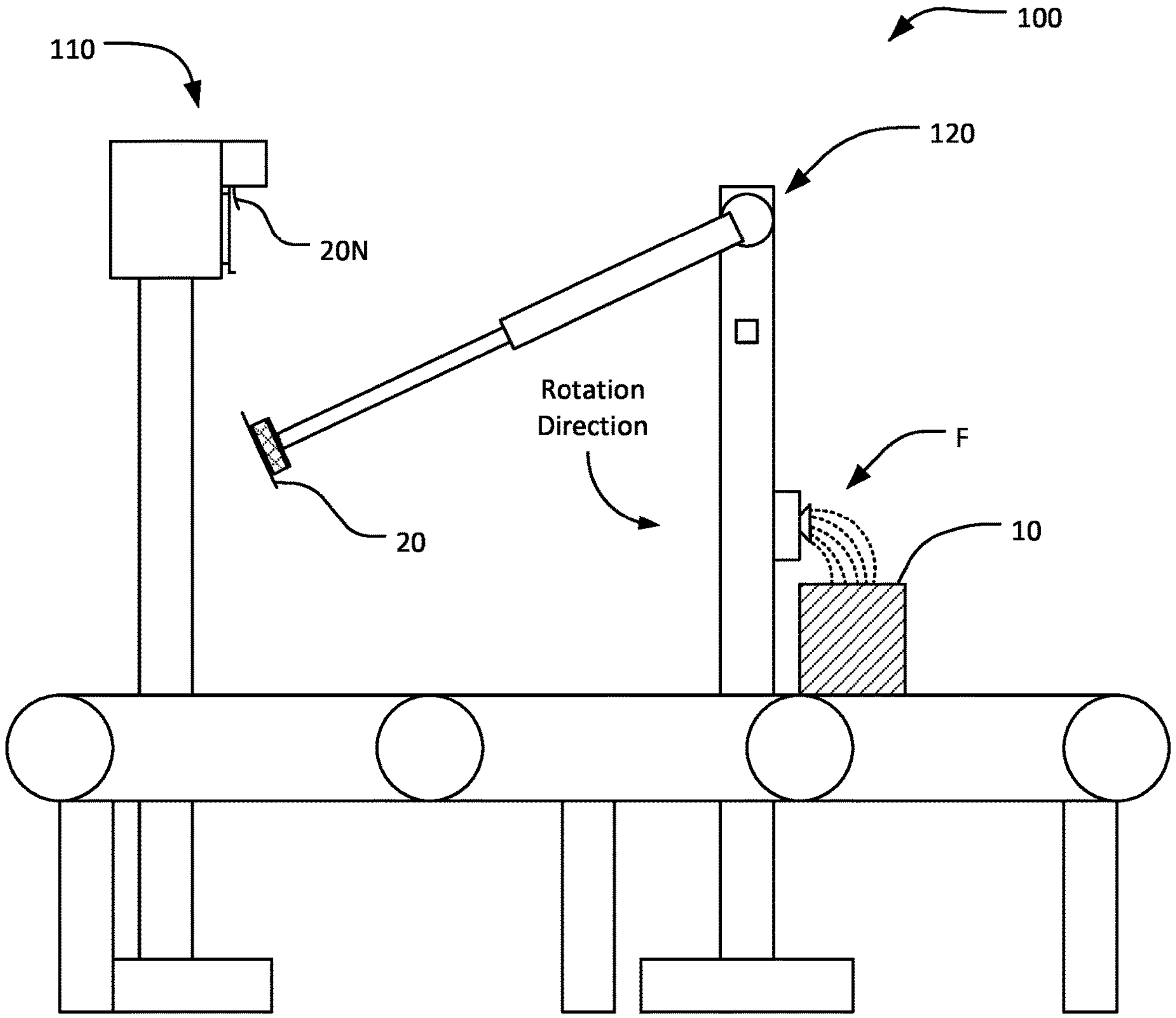
FIG. 10A illustrate example operation of another label printing and applying system, in an embodiment.

At step 150, fluid may be sprayed onto the label 20 and/or on the substrate 10 (which substrate 10 may be moving on the conveyer belt) by the sprayer 116 to allow for the dissolvable liner or dissolvable adhesive liner at the underside of the label 20 to be activated. For example, the rotatable arm 120 may continue to rotate towards the substrate 10 while the label 20 is adhered to the tamp head 130 and resultantly bring the label 20 proximate the sprayer 116 (see FIG. 10) in another intermediate position. The sprayer 116 may spray fluid F (e.g., water) on the label 20 to dispel the dissolvable liner or dissolvable adhesive liner thereon. Alternately or additionally, the sprayer 116 may spray the fluid F onto the substrate 10 itself so that the moistened substrate 10 may dispel the dissolvable liner on the label 20 when the label is brought in contact therewith, as shown in FIG. 10A.

Figure 11:
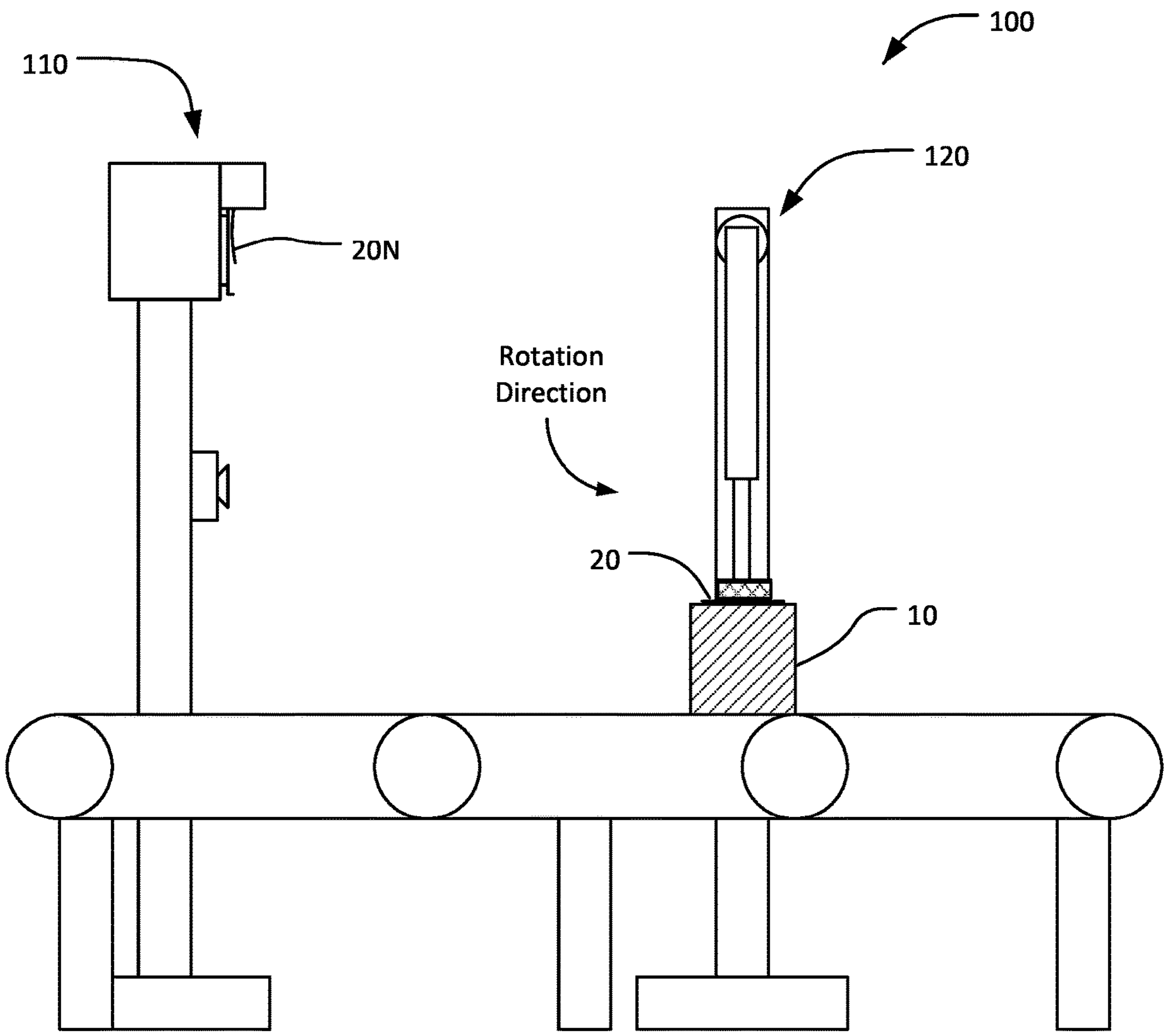

At step 152, the rotatable arm 120 may continue to rotate towards the substrate 10, and eventually, the movable plunger 122 may cause the tamp head 130 to sandwich the label 20 between the substrate 10 and the tamp head 130 (see FIG. 11). This position of the arm 120 may be referred to as the second position. When the underside of the label 20 contacts the substrate 10, the moisture on the underside of the label 20 and/or on the substrate 10 may cause the dissolvable liner coating disposed on the label 20 to dissolve into the substrate 10 to adhere thereto (e.g., by nature of the label 20 exposed adhesive, by nature of the label 20 dissolvable liner infiltrating the substrate 10 and drying therein, et cetera).

Figure 12:
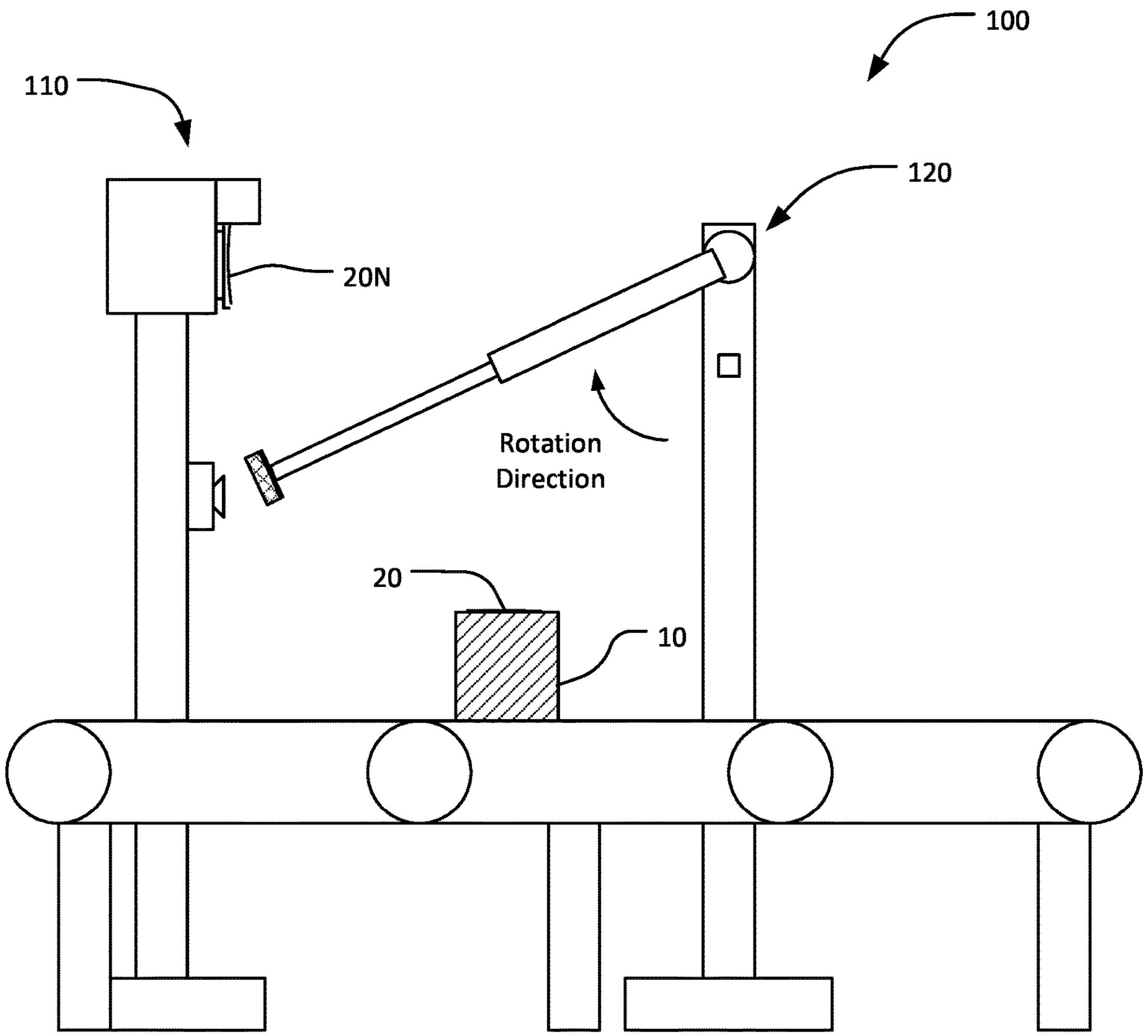

At step 156, once the label 20 is adhered, the rotatable arm 120 may return to its original position (see FIG. 12 showing the arm 120 returning to its original position). By this time, the printer 112 may already have printed the next label 20N in its entirety and deposited same into the tray 114 (see FIG. 12). Alternately, the printer 112 may have printed at least part of the next label 20N. The rotatable arm 120 may therefore collect the next label 20N from the tray 114, and apply the next label 20N to the next substrate 10 as discussed above. In this way, the waiting time requirement may be eliminated or at least greatly reduced, allowing for a greater number of labels to be printed and applied to substrates in a given time period compared to the prior art, yielding significant cost savings.

It is to be understood that the steps of the method 140 need not be carried out in the exact order as described, that some steps may occur simultaneously with other steps, and that some steps may be optional, and that each of these combinations of carrying out the method 140 are within the scope of the present disclosure. For example, spraying of the fluid F by the sprayer 116 at step 150 may be unnecessary where a traditional paper liner and/or adhesive is being used, as opposed to a dissolvable liner.

As noted above, one advantage of the labeling system 100 may be that it may allow a printer to continuously print labels while the tamp head is moving between the printer and a desired surface for label application. Conversely, printers on existing label applicator systems may only be able to print off the next label for application once the tamp head has returned to the printer. Because the next label in an automatic label applicator system 100 may be ready and waiting for pick up by the tamp head as soon as the tamp head completes its cycle, there may be a significant reduction in the time it takes to apply a large number (e.g., thousands) of labels, relative to existing label application systems.

Figure 13:
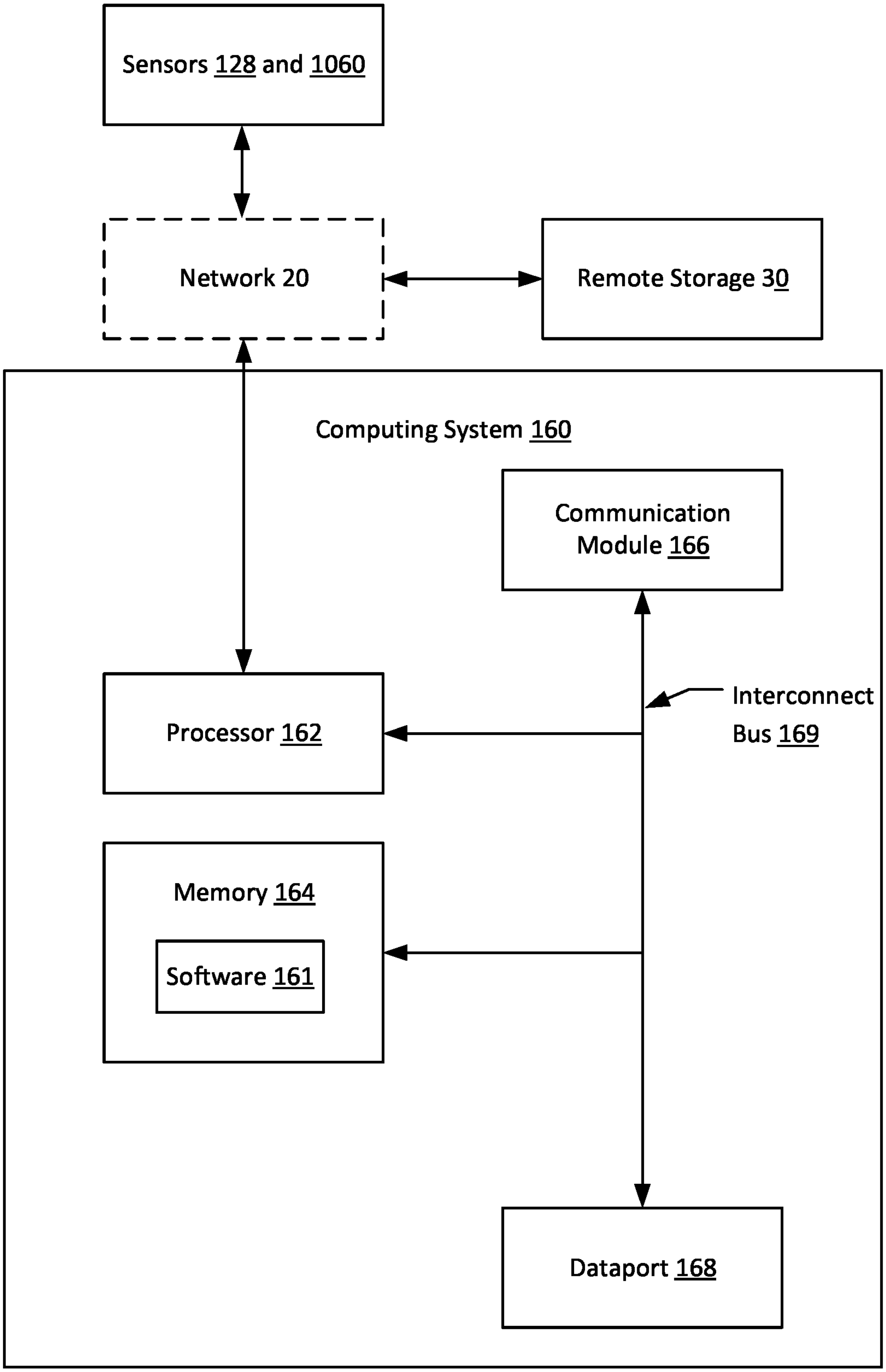
FIG. 13 is a block diagram illustrating a computing system of the label printing and applying system of FIG. 3.

FIG. 13 is a functional block diagram of the computing system 160 which may be used to implement the various printer and/or labeling apparatus embodiments according to the different aspects of the present disclosure. The computing system 160 may be, for example, a smartphone, a laptop computer, a desktop computer, a flexible circuit board, or other computing device whether now known or subsequently developed. The computing system 160 comprises a processor 162, the memory 164, a communication module 166, and a dataport 168. These components may be communicatively coupled together by an interconnect bus 169. The processor 162 may include any processor used in smartphones and/or other computing devices, including an analog processor (e.g., a Nano carbon-based processor). In certain embodiments, the processor 162 may include one or more other processors, such as one or more microprocessors, and/or one or more supplementary co-processors, such as math co-processors. In embodiments, the computing system 160 may make use of a Linux CUPS driver which is compatible with ARM and/or AMD processing languages.

The memory 164 may include both operating memory, such as random access memory (RAM), as well as data storage, such as read-only memory (ROM), hard drives, optical, flash memory, or any other suitable memory/storage element. The memory 164 may include removable memory elements, such as a CompactFlash card, a MultiMediaCard (MMC), and/or a Secure Digital (SD) card. In certain embodiments, the memory 164 includes a combination of magnetic, optical, and/or semiconductor memory, and may include, for example, RAM, ROM, flash drive, and/or a hard disk or drive. The processor 162 and the memory 164 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 162 may be connected to the memory 164 via the dataport 168.

The communication module 166 may be configured to handle communication links between the computing system 160 and other external devices or receivers, and to route incoming/outgoing data appropriately. For example, inbound data from the dataport 168 may be routed through the communication module 166 before being directed to the processor 162, and outbound data from the processor 162 may be routed through the communication module 166 before being directed to the dataport 168. The communication module 166 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, 5G, or any other protocol and/or technology.

The dataport 168 may be any type of connector used for physically interfacing with a smartphone, computer, and/or other devices, such as a mini-USB port or an IPHONE/IPOD® 30-pin connector or LIGHTNING® connector. In other embodiments, the dataport 168 may include multiple communication channels for simultaneous communication with, for example, other processors, servers, and/or client terminals.

The memory 164 may store instructions for communicating with other systems, such as a computer. The memory 164 may store, for example, a program (e.g., computer program code) adapted to direct the processor 162 in accordance with the embodiments described herein. The instructions also may include program elements, such as an operating system. While execution of sequences of instructions in the program causes the processor 162 to perform the process steps described herein, hard-wired circuitry may be used in place of, or in combination with, software/firmware instructions for implementation of the processes of the present embodiments. Thus, unless expressly noted, the present embodiments are not limited to any specific combination of hardware and software.

In embodiments, the memory 164 includes software 161. The software 161 may contain machine-readable instructions configured to be executed by the processor 162. The software 161 may, for example, process data obtained from the sensor 128. In embodiments, the software 161 may cause the computing system 160 to dynamically respond to a reading obtained by the sensor 128. For example, the software 161 may direct the automated arm 120 to collect a label 20 in response to a sensor 128 determination that the label 20 has been deposited in the holding tray 114. As another example, the software 161 may direct the automated arm 120 to bring the label 20 into contact with the substrate 10 in response to a sensor 128 determination that the substrate 10 is ready to receive the label 20 (i.e., the substrate 10 is within reach of the automate arm 120).

The computing system 160 may be in data communication with a remote storage 40 over a network 30. The network 30 may be a wired network, a wireless network, or comprise elements of both. In embodiments, the network 30 may communicatively link one or more components of the labeling apparatus 100. For example, the sensor 128 may be communicatively linked to the computing system 160 via the network 30 for the exchange of information therebetween. The remote storage 40 may be, for example, the "cloud" or other remote storage in communication with other computing systems. In embodiments, data (e.g., readings obtained by the sensor 128 and the dynamic responses of the computing system 160 thereto) may be stored in the remote storage 40 for analytics.

Various types of labels having one or more of many different types of suitable adhesives may be printed and applied using the labeling apparatus 100. One example of a type of label that may be used with the labeling apparatus 100 is a conventional liner label, which comprises a face ply, an adhesive layer, and a liner ply. The face ply may have a top side where indicia (e.g., information, icons, text, etc.) may be printed, and a bottom side where the adhesive layer (e.g., hot-melt, acrylic based, rubber based, pressure sensitive, drying, etc.) is applied. The adhesive used include permanent adhesive (i.e., relatively difficult to remove and/or may damage the surface adhered to), removable adhesive (i.e., relatively easy to peel off), repositionable (i.e., relatively easy to remove and reapply for a short period of time before becoming permanent), remoistenable adhesive (i.e., adhesive that may be activated by moisture), etc. The liner ply may contain a release agent (e.g., silicone) on one or both sides, for removably coupling the liner ply to the bottom side of the face ply. In operation, the liner ply may be used to prevent the adhesive along the conventional liner label from adhering to undesirable surfaces. The liner ply may be removed to expose the adhesive prior to adhering the label to the substrate. In some embodiments, the label may forgo the use of a liner ply, and instead use specially crafted equipment (e.g., an adhesion-resistant printer 112 and/or holding tray 114) that may reduce or eliminate occurrences of the exposed adhesive sticking to undesirable surfaces.

In embodiments, the label 20, e.g., on an underside thereof, may include a "dissolvable liner." The dissolvable liner of the label 20 is unlike traditional paper liners that have to be peeled away from the face stock of the label 20 to expose the adhesive on the underside of the face stock. While traditional labels having conventional adhesive (e.g., pressure sensitive adhesive) may undesirably adhere to the holding tray 114 if they were held therein without the traditional paper liners, the dissolvable liner may circumvent such issues. In other words, the dissolvable liner may allow the labels 20 to be held in the holding tray 114 without allowing for undue interaction (e.g., adhesion) between the face stock of the label 20 and the holding tray 114.

Broadly, the phrase "dissolvable liner", as used herein, refers to a cover or coating for covering a first composition, which cover is specifically adapted to begin to dissolve or otherwise dispel when the cover is brought into contact with a second composition. When the cover is brought into contact with a third composition (either after the cover is brought into contact with the second composition or generally simultaneously therewith), the cover is configured to be absorbed into both the first composition and the third composition. In embodiments, the first composition may be an adhesive arranged on the label 20, the second composition may be water (e.g., water vapor, liquid water, et cetera), and the third composition may be the substrate 10. That is, in embodiments, the dissolvable liner may be a composition that: (a) covers the adhesive layer of the label 20 so as to preclude the adhesive layer from undesirably sticking to another object or surface (the dissolvable liner inert state); and (b) is configured to dissolve and/or dispel when the dissolvable liner is brought into contact with a fluid (the dissolvable liner activated state). In the activated state, the label 20 with the dissolvable liner may be readily adhered to the substrate 10 (i.e., the activated dissolvable liner may disintegrate and expose the label 20 adhesive layer). The term "dissolvable liner", as used herein, specifically excludes a traditional liner ply or plies, such as paper coated at least in part with silicone or other release material, a film, et cetera. The term "dissolve", as used herein, connotes that the dissolvable liner coating, once wetted, is dispelled or otherwise displaced. The dissolvable liner may be absorbed (e.g., partially, wholly) by the substrate 10. The dissolvable liner may thus perform the same function of a traditional liner (i.e., to cover the adhesive layer until the label is ready to be secured to a substrate) made of paper or polyester, but without employing a traditional liner ply.

As illustrated in Table 1 below, in embodiments the dissolvable liner may include a remoistenable adhesive 222 (e.g., a non-toxic remoistenable adhesive), activated coconut carbon filtered water 224, and powdered gypsum 226. The activated coconut carbon filtered water 224—which, as is known, may be devoid of many of the impurities typically found in tap water—may desirably affect the viscosity of the remoistenable adhesive 222 for the instant application. Further, it is believed that the activated coconut carbon filtered water 224 may allow the final dissolvable liner composition to disintegrate and dissolve readily upon the application of tap or other water (as discussed below). The powdered gypsum 226 may serve, among other things, to increase the stability and the temperature resistance of the remoistenable adhesive 222. The gypsum 226 may also serve as a blocking agent, such as by precluding the remoistenable adhesive 222 from being undesirably activated in humid ambient conditions. In embodiments, the dissolvable liner may include different (e.g., additional) ingredients. For example, where it is desired to give the dissolvable liner a hue (e.g., an off-white (or any other) hue such that the dissolvable liner resembles the traditional paper liners), a colored pigment may be included to impart such a hue to the dissolvable liner.

Table 1 below shows the constituents of the dissolvable liner (also referred to herein as a "dissolvable liner coating"), according to one illustrative embodiment of the present disclosure, with which the label 20 may be coated to preclude the face ply from undesirably adhering to objects and to allow the label to be adhered to the substrate 10 when desired. The dissolvable liner may temporarily cover the label 20 back face while the label 20 printable face is exposed for printing.

TABLE 1

| DISSOLVABLE LINER 115 | | | |
|---|---|---|---|
| No. | Ingredient 202 | Quantity range 204 | Preferred quantity 206 |
| 1 | Non-toxic remoistenable adhesive 222 | 2 lbs. to 6 lbs. | 4 lbs. |
| 2 | ACC water 224 | 0.125 lbs. to 0.375 lbs. | .25 lbs. |
| 3 | Gypsum 226 | 1-50 heaping teaspoons (about 0.05 lbs. to 2.8 lbs.) | 21 heaping teaspoons (about 1.2 lbs.) |

The quantity ranges 204 and the preferred quantities 206 of the various ingredients 202 listed above are merely exemplary and are not intended to be independently limiting. For example, in embodiments, more activated coconut carbon filtered water 224 ("ACC water") may be added to reduce the viscosity of the dissolvable liner coating 115, more gypsum 226 may be added to further enhance the stability of the adhesive 222, et cetera. Further, in embodiments, the preferred quantities 206 of the various ingredients 202 listed above may be proportionally reduced or increased for smaller or larger applications, respectively. The preferred quantities 206 listed above will yield a volume of about 5.45 lbs. of the dissolvable liner coating 115, which may be used to coat many thousands of labels. A method 500 (FIG. 14) for making and using a label with a dissolvable liner is discussed in greater detail below.

In an embodiment, the remoistenable adhesive 222 may have a vapor pressure at 20° C. of about 23.4 hPa, a density at 20° C. of about 1.08 g/cm$^3$, a pH value at 20° C. of 4.0-6.0, a flash point of over 232° C., and a VOC content of 1.6 g/l/0.01 lb/gl. For example, in an embodiment, the remoistenable adhesive 222 may be the PriscoBond 121-H remoistenable adhesive commercially available by Prisco®. Alternately or additionally, in other embodiments, the remoistenable adhesive may be one or more of the remoistenable adhesives disclosed in U.S. Pat. No. 3,574,153 to Sirota, U.S. Pat. No. 4,575,525 to Wancome et al., U.S. Pat. No. 4,623,688 to Flanagan, U.S. Pat. No. 5,296,535 to Fazioli et al., each of which are incorporated by reference herein. Other remoistenable adhesives known to the artisan and/or subsequently developed may likewise be employed. Applicant's experimentation confirms that off-the-shelf remoistenable adhesives 222 disclosed herein, such as the PriscoBond 121-H product, cannot suitably be used as adhesive covers for labels until the other ingredients 202 (i.e., the ACC water 224 and Gypsum 226) are added thereto.

In embodiments, the dissolvable liner may exhibit adhesive properties only after the dissolvable liner is activated by a fluid. Such a dissolvable liner configuration may be referred to herein as a "dissolvable adhesive liner." Much like the dissolvable liner discussed above, the dissolvable adhesive liner may be selectively activatable (i.e., between an inert state and an activated state) by applying a fluid (e.g., water) thereto.

In a label employing the dissolvable adhesive liner, the adhesive layer traditionally employed in labels (including in the dissolvable liner label discussed above) may be replaced with a hydrophilic coating, and the traditional adhesive layer may be omitted in its entirety. The dissolvable adhesive liner may thus include a face stock that on its underside has a hydrophilic coating which is covered by a dissolvable liner. The hydrophilic coating may be any coating with suitable hydrophilic properties, such as an inkjet coating. The hydrophilic coating may be arranged between the dissolvable liner and a face ply of the label 20 such that the dissolvable liner covers the hydrophilic coating. Upon activation, the dispelled dissolvable liner of the dissolvable adhesive liner may be drawn (i.e., absorbed) into both the hydrophilic coating and the substrate 10. When so absorbed, the dissolvable adhesive liner may exhibit adhesive properties and form a bond with both the label 20 and the substrate 10, thus causing the label 20 to adhere to the substrate 10.

Thusly, a label 20 with such a dissolvable adhesive liner may forgo a traditional adhesive layer and a traditional liner ply. Because the label 20 with a dissolvable adhesive liner may not use a conventional adhesive layer, such a label may be printed using any technology now known or subsequently developed (such as a direct thermal printer, a thermal transfer printer, a laser printer, an inkjet printer, et cetera). The dissolvable adhesive liner may be heat-resistant and may be able to readily withstand the relatively high temperatures encountered by labels in printers (e.g., laser printers).

Figure 14:
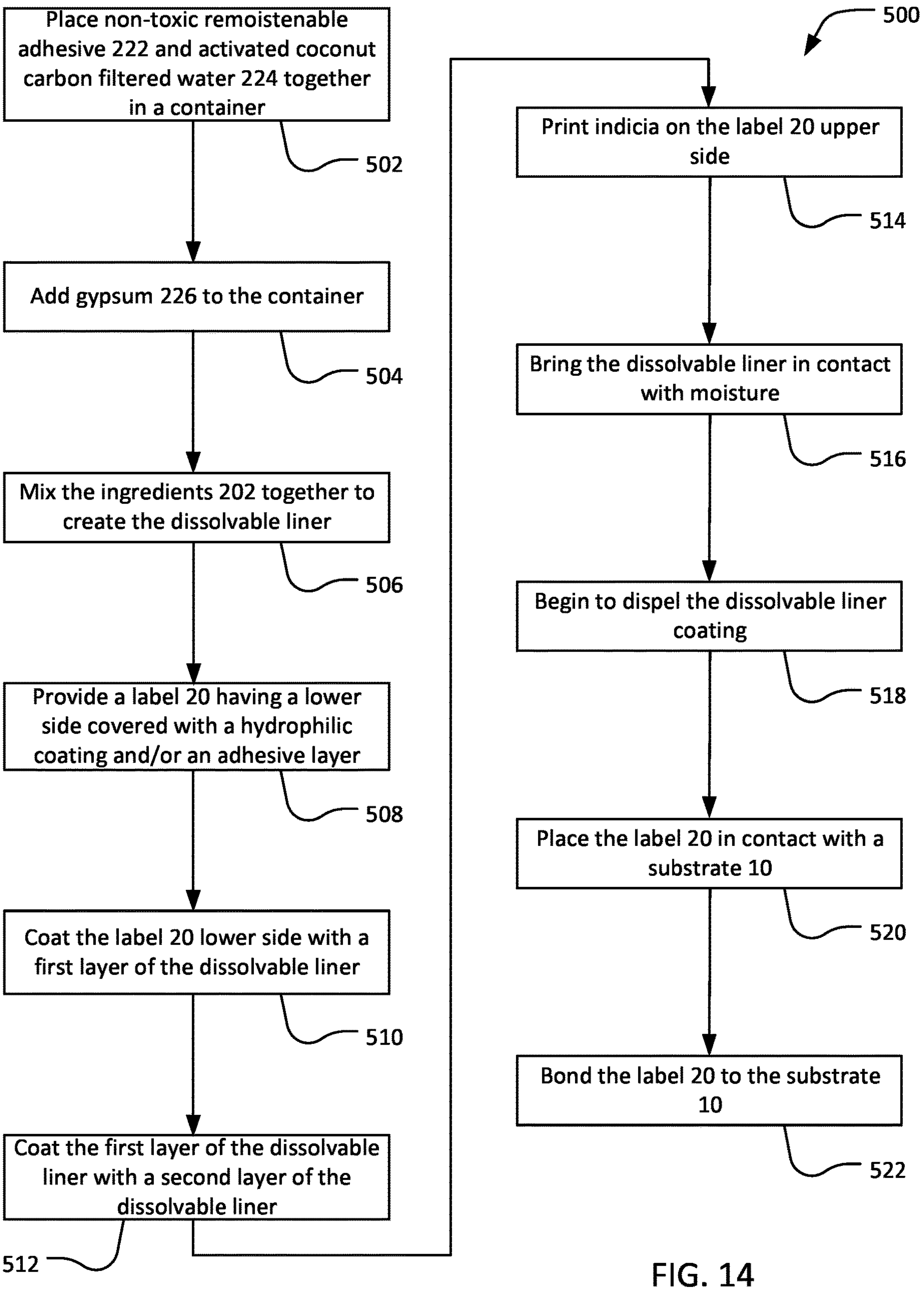
FIG. 14 is a flowchart illustrating a method for making and using labels with a dissolvable liner for using with the label printing and applying system of FIG. 3.

FIG. 14 is a flow chart illustrating a method 500 of making and using the label 20 (e.g., a dissolvable liner label, a dissolvable adhesive liner label, etc.), in an embodiment. At step 502, a non-toxic remoistenable adhesive 222 may be placed in a container together with activated coconut carbon filtered water 224. For example, 4 lbs. of PB121-H-Prisco® may be weighed and placed in a container together with 0.25 lbs. of activated coconut carbon filtered water. Thereafter, at step 504, about 1.2 lbs. (i.e., about 21 heaping teaspoons) of gypsum 226 may be placed in the container. The quantities of the various ingredients may be proportionally different or different. At step 506, the ingredients 202 may be mixed together. For example, in an embodiment, a cutting blade spinning at about 2,000 rpm may be used to mix all the ingredients 202 until the resulting mixture becomes relatively smooth and homogenous. At step 508, the back side of a label 20 may be covered (e.g., by an adhesive layer and/or a hydrophilic coating). At step 510, the label 20 lower side may be coated with a first layer of the dissolvable liner (i.e., the first layer may be applied to the label 20 such that the hydrophilic coating and/or adhesive layer is between the label 20 face stock and the first dissolvable liner layer). Once the dissolvable liner first layer is dried (e.g., by a dryer), then, at step 512, a second layer of dissolvable liner may be applied and dried. Additional layers of the dissolvable liner may also be provided.

In embodiments, only a solitary layer of the dissolvable liner may be employed to cover the hydrophilic coating and/or adhesive layer. In other embodiments, and particularly when employing the dissolvable adhesive liner label (as opposed to the dissolvable liner label), two (or more) layers of the dissolvable liner may be successively dried and applied. Applicant's experiments have shown that the multiple combined dissolvable liner layers may be more suitable for certain applications.

While the method 500 illustrates an embodiment of the label 20 using two layers of dissolvable liner, it is to be understood that more layers of dissolvable liner may be used. For example, a preferable range of dissolvable liner layers may be two to four layers, though the label 20 can be configured to include more layers of dissolvable liner. Including more than four layers of dissolvable liner may require a greater amount of hydrophilic coating, which may increase the cost of the label 20. Each layer of the dissolvable liner may be relatively thin (e.g., 0.1 to 0.2 mm thick). Conversely, if traditional remoistenable adhesive were to be used, one would have to use 10-15 times more adhesive for the same application, which may, in addition to having other drawbacks, may be cost prohibitive.

At step 514, indicia may be printed (e.g., via the printer 112) on the upper side of the label 20. The label 20 may be printed using any suitable printer type (including any conventional printer, such as a direct thermal printer, a thermal transfer printer, a laser printer, et cetera). Specifically, as the label 20 is passed through the printer, the top face thereof may receive printed indicia whereas the dissolvable liner may cover the label 20 lower side and preclude the label 20 from adhering to printer parts. When the label 20 is ready to be adhered to a substrate, the dissolvable liner coating may be brought into contact with water or another fluid (e.g., via the sprayer 116) at step 516 to cause the dissolvable liner coating to dispel. The activated dissolvable liner may then be made ready to reveal the adhesive layer, or permeate the label 20, the hydrophilic layer, and/or the substrate 10.

Moisture (used herein interchangeably with "water" or "fluid") may be introduced to the dissolvable liner directly and/or indirectly. In an embodiment, the substrate 10 (e.g., the box, package, envelope, etc.) and/or a section thereof may be moistened with water and the dissolvable liner may be placed on the moistened section of the substrate 10 so as to allow the dissolvable liner coating to interact with the moisture on the substrate 10 (indirect moistening) and dissolve (e.g., dissolve into the substrate 10 and the hydrophilic coating). In another embodiment, instead of moistening the substrate 10 and then placing the dissolvable liner on the moistened substrate 10, the dissolvable liner coating itself may be moistened to cause the dissolvable liner coating to dispel (direct moistening) and then the label 20 may be situated on the substrate 10. For example, if the moisture is applied directly to the dissolvable liner coating, the label 20 may then be adhered to the substrate 10 any time within the next 90 seconds or so. Alternately, if the substrate 10 is moistened instead of directly moistening the dissolvable liner coating, then the label 20 may have to be placed on the moistened section of the substrate 10 within 3-20 seconds or so (as the moisture may thereafter be absorbed by the substrate 10 and may not be able to serve to activate the dissolvable liner coating). In some embodiments, moisture may be introduced to the dissolvable liner coating both directly and indirectly (i.e., the substrate 10 may be moistened and the dissolvable liner coating may also be moistened before the contact is made with the moistened substrate 10).

At step 518, the moisture introduced to the dissolvable liner coating (e.g., directly and/or indirectly) may cause the dissolvable liner coating to dispel. At step 520, if the moisture was introduced to the dissolvable liner directly, the label 20 may now be situated on the substrate 10, and the substrate 10 may absorb (e.g., partially) the dissolvable liner coating. Conversely, if the moisture was introduced to the dissolvable liner indirectly (e.g., a section of the substrate 10 was moistened and the dissolvable liner was placed in contact with the moistened section of the substrate 10), the moisture on the substrate 10 may cause the dissolvable liner coating to dispel and the liner coating may be absorbed (e.g., partially) by the substrate 10.

At step 522, the label 20 may bond to the substrate 10 (e.g., by virtue of the now-drying activated dissolvable liner which has infiltrated the substrate 10 and the hydrophilic layer, the exposed adhesive layer, et cetera). In this way, by needing water to activate the dissolvable liner, the dissolvable liner may remain in the inert state until the label 20 is to be applied to the substrate 10. Furthermore, the requirement for a traditional liner ply may be negated, as well as, in some embodiments, the requirement for a traditional adhesive layer. The amount of water used to dissolve the liner coating may be negligible (e.g., relative to traditional remoistenable adhesives) and may not cause any appreciable damage to the substrate 10. Once the dissolvable liner is wetted (directly and/or indirectly) and the label 20 is situated on the substrate 10, the dissolvable adhesive liner may dissolve relatively quickly such that the label 20 can generally simultaneously be adhered to the substrate 10. That is, dissolving of the dissolvable liner coating into the substrate 10 in step 518 and adherence of the label 20 to the substrate 10 in step 520 may occur generally at the same time.

It is to be understood that the steps of the method 500 may be modified, added to, and/or omitted as desired, and that such considerations have been contemplated and are within the scope of the present disclosure. For example, the artisan may understand that the method 500 may be readily modified to apply a single layer of dissolvable liner to the label 20.

Thus, as has been described, the dissolvable liner may, in effect, replace both traditional liner plies and the adhesive layers of prior art labels, and labels 20 employing a dissolvable liner may be used in any application where prior art labels were heretofore employed.

In some embodiments, the labels 20 may comprise marketing materials. The marketing materials may comprise one or more tabs portraying indicia. The tabs may be attached to and/or formed as part of the conventional liner label, the dissolvable liner label, or both. In some embodiments, the tabs may be removably attached to the labels by perforations, allowing for the tabs to be torn off. The indicia may comprise information for a consumer, such as coupons, advertisements, promotions, etc. For example, the marketing materials may be several tabs with "20% OFF NEXT PURCHASE" printed on each of them, and the tabs may be torn away from their labels 20 for use. In some embodiments, the marketing materials may be a separately applied label 20 of a type described previously (e.g., a dissolvable liner label or a conventional liner label).

A flowchart depicting a method 250 for stacking labels 20 on a substrate 10 is shown in FIG. 7. The process begins at step 252, where a first label 20 (i.e., a dissolvable liner label or a conventional liner label) is applied to a surface 10. For example, the liner ply may be removed from the face ply of the conventional liner label to expose the adhesive along the bottom side for application to the surface 10, or the surface 10 may be wetted and the dissolvable liner label may be placed in contact with the surface 10 for adhesion therebetween. Marketing materials may be incorporated into the labels 20 as described above. At step 254, a second label 20N (e.g., a dissolvable liner label, a conventional liner label, another label type) may be applied. The second label 20N may be applied over the surface 10, the first label 20, or at least some of both. For example, the second label 20N may be placed in such a manner so as to cover the entire first label 20, except for the tabs of marketing materials of the first label 20. In embodiments where the second label 20N is a dissolvable liner label, both the surface 10 and the first label 20 may be wetted in preparation for application of the dissolvable liner label. In some embodiments, the dissolvable liner labels may be wetted instead of or in addition to the surface 10 and/or the other labels. The second label 20N may be a packing list, a coupon, or any other substrate containing indicia.

At step 256, steps 252 and 254 may be repeated until there are a desired number of labels 20 stacked on the package 10. Each additional label 20 may cover some or all of the preceding label 20. It is to be understood that the number of labels 20 that can be stacked is not limited in the scope of the present disclosure.

Figure 15:
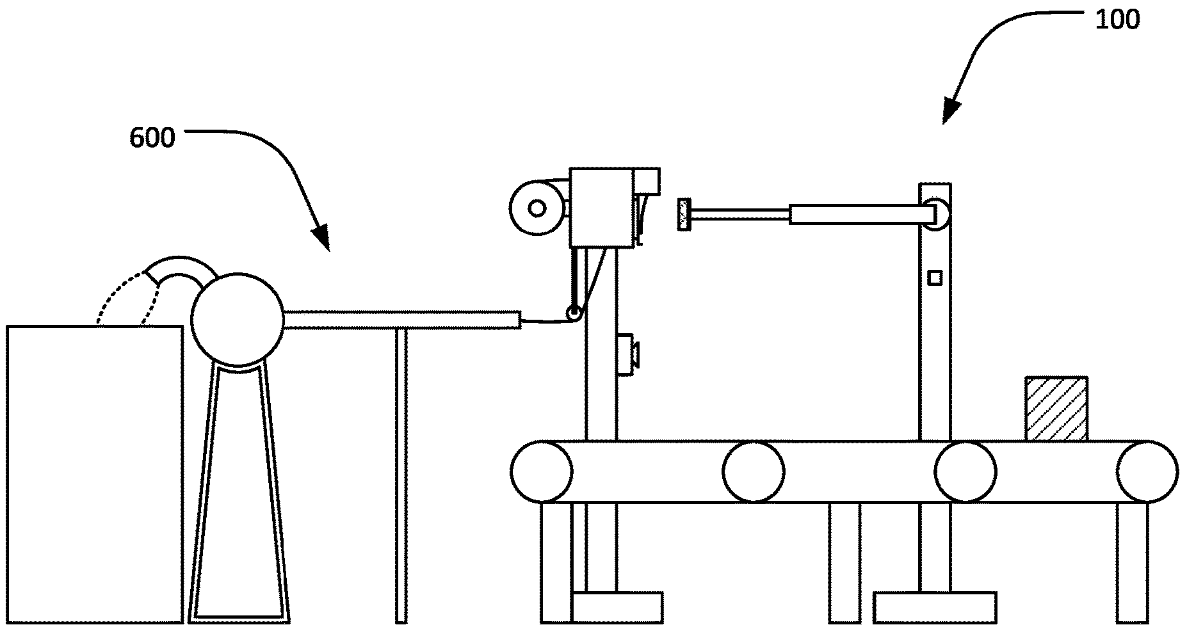
FIG. 15 is a side view of a matrix peel assist system, according to an embodiment of the disclosure.
Figure 16:
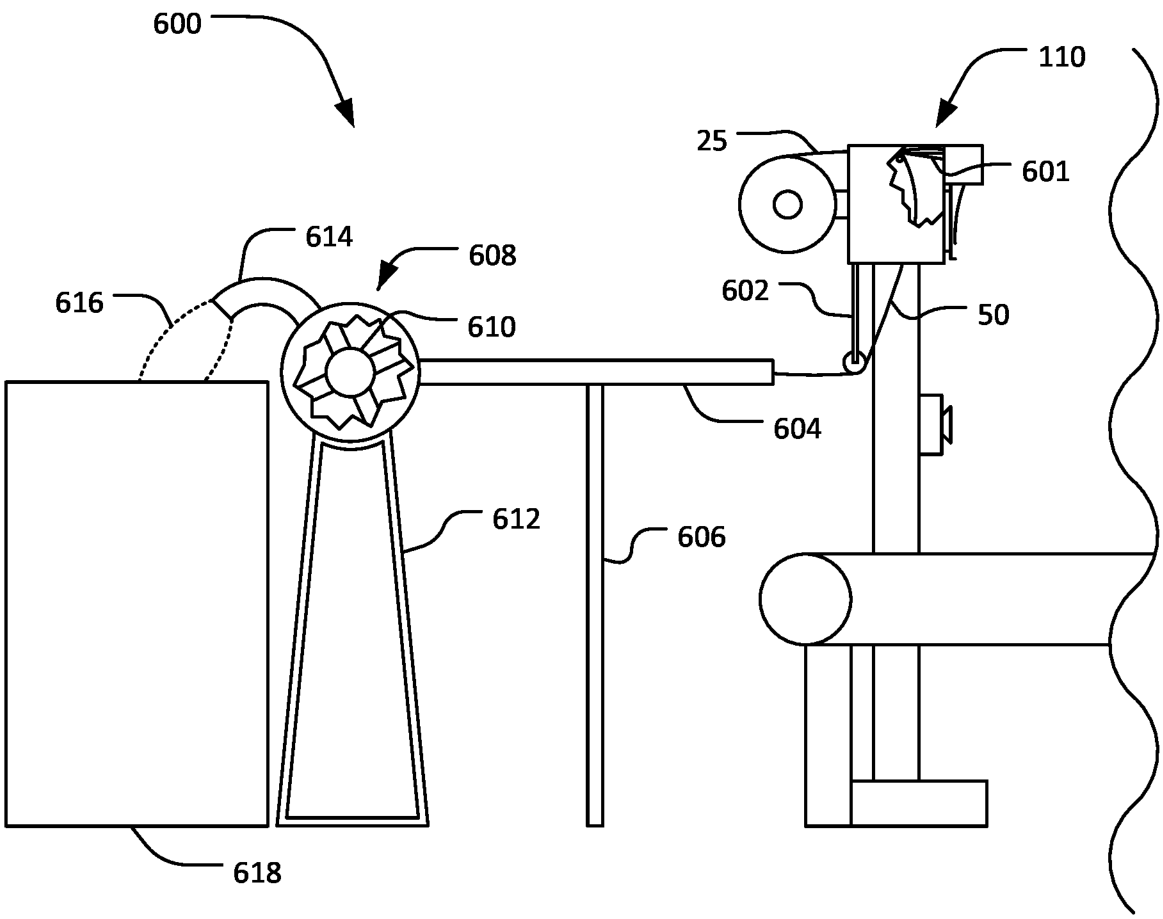
FIG. 16 is a detailed side view of the matrix peel assist system of FIG. 15.

FIGS. 14-16 illustrate an embodiment 600 of a matrix peel assist system (also referred to herein as a "matrix removal system") that may be used with, for example, the label applicator system 100. Typically, labels (e.g., conventional labels, labels 20, etc.) for feeding into a printer (e.g., printer 112) are situated on a matrix of continuously connected material, such as paper. In embodiments, this label matrix may be included alternately or in addition to the usual liner, or dissolvable liner, of the labels. The label matrix provides a surface to which a plurality of these labels may be removably coupled to, prior to their use in print and apply machines (e.g., label applicator system 100). The label matrix allows for the easy storage of these plurality of labels in a stack or roll prior to use.

Typically, the labels and their matrix are both fed into a printer, generally of a print and apply machine, where the labels are separated from the label matrix. This is often accomplished by exploiting lines of weakness (e.g., perforations) coupling the labels to the matrix. Another method of separating the labels from the matrix is via a peeler 601 (FIG. 16) which contacts and separates the two as the labels and the matrix move through the staging area 110. This peeler 601 may be, for example, disposed upstream the printer 112 (i.e., the label and the matrix may be separated prior to printing on the label). An example peeler of the type usable with the matrix removal system 600 is shown in U.S. Pat. No. 10,086,599, incorporated herein by reference. In embodiments, the system 600 may make use of the printer 1000 and the peel bar 1040 to separate liners from labels. The peeler 601 may begin separation of the labels from the matrices manually (e.g., an operator may bring the first label and matrix in contact with the peeler 601 for separation) in some embodiments, or automatically (e.g., the printer 112 may bring the first label and matrix into contact with the peeler 601 without having to rely on operator guidance) in others. Regardless of the method of separation, the matrix is to be discarded once the labels are removed therefrom. Typical printers route the used matrices out of the printer and allow them to fall into a receptacle for later disposal. However, this gravity driven method is not free from issues.

The matrices do not weigh a significant amount because they are made from a paper or paper-like material, which decreases the gravitational force the matrices experience. This means that the matrices may easily stray from their intended path within the printer and are liable to jam or cause blockages. Another issue is that the receptacle for receiving the matrices generally takes up valuable space and is constrained to limited locations in order to receive the used matrices. For instance, the conventional receptacle must be positioned in a vicinity underneath the printer to receive the falling matrices. This may be an issue since this means that the matrix receptacle is forced to occupy areas where it may be otherwise more desirable to place critical components, such as a conveyor belt, a label application machine, et cetera. Conventional methods (e.g., a series of rollers) to route the used matrices further away may introduce too much of an increase to printer cost and complexity to be commercially viable. Finally, the used matrices are generally left as is before being placed into the receptacle, landing in a jumbled manner and taking up a lot of space. This results in receptacle that is not optimally filled. Because of this, the receptacle must be emptied many times over a given period and/or must be made quite large, both options being inefficient. Embodiments of the matrix removal system described herein may remedy at least some of these issues.

FIGS. 14 and 15 show an embodiment 600 of a matrix peel assist system which may be used in conjunction with, for example, the label making and applying system 100, the printer 1000, et cetera. In some embodiments, the matrix removal system 600 may be used with any suitable print and apply system now known or subsequently developed. In operation, the matrix removal system 600 may accept material (e.g., used label matrices) ejected from an adjacent printer using a vacuum charged conduit. The conduit may be used to route the used matrices to a matrix receptacle, whereupon the matrices may later be recycled, disposed of, et cetera. The matrices may undergo further processing (e.g., shredding, cutting, etc.) on their way to the matrix receptacle. The vacuum charged nature of the conduit may serve a dual purpose of pulling the used label matrix to the matrix receptacle while providing tension to the rest of the label matrix which has yet to enter the conduit. In this manner, the matrix removal system 600 may efficiently route the used matrix away from the printer while mitigating the matrix's tendency to jam or cause blockage within the printer. In some embodiments, the print and apply system, conventional or otherwise, may be retrofit with the matrix removal system 600.

FIG. 15 details example components of the matrix removal system 600, in an embodiment. The matrix removal system 600 may receive used label matrices 50 from a printer, such as the printer 112 of the system 100. The label matrices 50 may be whatever strip of material remains after the labels 20 are removed from the label strip 25 that feeds into the printer 11. The used matrix 50 may be fed into a pipe or conduit 604 sized to fit the matrix 50, whereupon the matrix 50 may eventually travel through an exit 614 and into a matrix receptacle 618. The conduit 604 may be charged with a vacuum using, for example, a pump 608. With this vacuum charge, the conduit 604 may both convey and guide the used matrix 50 away from the printer 112 and into the receptacle 618.

In some embodiments, the conduit 604 may be shaped to receive the matrix 50 directly from staging area 110 (e.g., the conduit 604 may curve up to the point where the matrix 50 exits the staging area 110). Alternately, the system 600 may include a support with roller 602 which the matrix 50 contacts upstream of an entrance of the conduit 604. The support with roller 602 may assist in orienting the matrix 50 as the matrix 50 exits the staging area 110 and enters the conduit 604. The support with roller 602 may be mounted to any suitable surface (e.g., the ground, the conduit 604, the printer 112, the staging area 110, et cetera).

The conduit 604 may be made from any suitable material or combination of materials now known or subsequently developed. For instance, the conduit 604 may be made from a flexible material to allow the conduit 604 to be arranged in various configurations to suit its environment. As another example, the conduit 604 may be made from a rigid material to increase its durability and to withstand the vacuum forces produced by the pump 608. The conduit 604 may be sized to balance both facilitating matrix 50 travel and the vacuum charge applied to the conduit 604. For instance, the conduit 604 may be sufficiently large enough to mitigate matrix 50 blockage, since the matrix 50 tends to twist and/or tumble as it travels, while still maintaining a suitable vacuum charge. In embodiments, the conduit 604 may include one or more supports 606 attached to any suitable surface (e.g., other portions of the system 600, portions of the system 100, the ground, an adjacent wall, et cetera).

The pump 608 may be any suitable motor, fan, pump, or combination thereof for producing a vacuum, sufficient to adequately charge the conduit 604, now known or subsequently developed. For example, in an embodiment, the pump 608 may have a nominal inlet size 4", a wheel size and type of 10⅝"×2⅝", a fan RPM of 1750, and a motor operating at ⅓$^{rd}$ horsepower, 125/230V, and 60 Hz. The characteristics of operation of the pump 608 (e.g., the volume of air moved, the force exerted by the vacuum, etc.) may be manually set (e.g., an operator sets the conditions of the vacuum in the pipe 604) and/or automatically set (e.g., the system 600 uses sensors and a computing system, such as the computing system 160, to determine the pump 608 operating conditions). The vacuum force within the pipe 604 may be sufficient to pull the matrix 50 through the conduit and out into the receptacle 618, but not so forceful as to unduly pull on the label strip 25 to which the matrix 50 is attached. In this manner, the matrix 50 may be routed to the receptacle 618 while providing tension to the matrix 50 that has yet to enter the conduit 604. It has been found this tension facilitates the printing of the labels 25 by dramatically reducing the jamming of the printer 112 by these labels 25. That is, the tension minimizes any sag in the label assembly and thereby reduces printer jams.

The pump 608 may be directly coupled to the conduit 604 for the charging thereof. Alternately, in embodiments, the pump 608 may be remote from the conduit 604 (e.g., coupled by an intermediary pipe or other structure for conveying the vacuum charge to the conduit 604). The pump 608 may be, but need not be in every embodiment, situated near the exit 614. Like the pipe 604, the pump 608 may have associated therewith one or more supports 612. Embodiments of the system 600 may forego one of the supports 606 and 612, alternately or in addition to one of the pump 608 and the pipe 604 sharing one of the support 606 and 612 with the other. In still more embodiments, the supports, 602, 606, and/or 612 are adjustable, such that they be specifically configured for a given environment.

A matrix processor 610 may be arranged at or near the exit 614. The matrix processor 610 may be, for example, a fan, a shredder, etc., configured to cut-up, shred, mince, or otherwise reduce the matrix 50 into smaller portions. The cut-up matrix 50 may then be propelled out of the exit 614 into the receptacle 618. By using the matrix processor 610 to reduce the matrix 50 into smaller pieces, the system 600 can increase the density of matrix 50 placed in the receptacle 618 relative to conventional matrix disposal methods. In this manner, a relatively smaller receptacle 618 may be used (i.e., for handling roughly the same volume of matrices 50) and/or the receptacle 618 may not be filled as fast. In some embodiments, and as shown in FIG. 16, the matrix processor 610 may be located within the pump 608 and the exit 614. In alternate embodiments, the matrix processor 610 may be located elsewhere, such as external to and adjacent the exit 614.

The exit 614 may have attached thereto an enclosure 616 configured to assist with directing the matrix 50 into the receptacle 618 while precluding spillage, such as a funnel or a net. This may be especially advantageous in embodiments where the matrix 50 has been reduced to smaller pieces by the matrix processor 610.

FIG. 17 is a flowchart depicting a method 650 of operating the embodiments of the matrix removal system described herein. First, at step 652, the label strip 25 may be fed into the printer (e.g., printer 112). The labels 20 may be separated from the matrix 50, at step 654, e.g., via the peeler 601. The labels 20 may continue along their path, while the used matrix 50 is diverted away. The conduit or pipe 604, at step 656, may be charged with a vacuum via the pump 608 manually and/or automatically, as described above.

At step 658, an end of the matrix 50 may be fed into the vacuum charged conduit 604, and the vacuum of the conduit 604 may begin to provide tension to the matrix 50. This step may be accomplished, for example, via an operator manually placing the end of the matrix 50 in or near the entrance to the conduit 604. At step 660, the matrix inside the conduit 604 is pulled towards the exit 614 while the matrix 50 preceding the conduit 604 is held taut by the vacuum. At step 662, the matrix 50 may pass through the matrix processor 610 to be reduced into smaller portions (e.g., through shredding, dicing, cutting, et cetera). Then, at step 664, the processed matrix 50 may be placed in the matrix receptacle 618 via the exit 614.

It is to be understood that the steps of the method 650 may be modified, added to, and/or omitted as desired, and that such considerations have been contemplated and are within the scope of the disclosure. For example, the artisan may understand that the method 650 may be readily modified to add a step of further processing the used matrix 50, such as through recycling.

A mobile embodiment 700 of the labeling apparatus is shown in FIG. 17. The labeling apparatus 700 may be more mobile (e.g., moveable, relocatable, etc.) than the embodiment 100. The labeling apparatus 700 may include a printer 110' that may be like the printer 112, except that it may be specifically configured to be used with a mobile cart 712. The cart 712 may be any suitable cart, platform, container, etc., that is configured to house on and/or within some or all of the components of the embodiment 700. The cart 712 may be made mobile by a mobile system 713, such as wheels, casters, tracks, treads, et cetera.

Like the printer 112 the printer 110' may have a holder/distributor where labels 25 for use with the printer 110' are located. A matrix 50 of liners removed from the rest of the printed labels 25 may be fed (e.g., gravity fed) to a conduit 704. The conduit 704 may include any number and configuration of funnels, spacers, guides, aligners, etc. to facilitate the entry, feeding, and travel of the matrix 50 in the conduit 704. The matrix 50 may be routed through the conduit 704 to a pump 708 and a matrix processor 710. The pump 708 and the matrix processor 710 may be similar to the pump 608 and the matrix processor 610, respectively, as described above. To wit, the pump 708 may apply a vacuum charge to the conduit 704 that may facilitate the movement of the matrix 50 therethrough. The matrix processor 710 may process (e.g., cut, tear, shred, dice, etc.) the matrix 50 traveling therethrough to facilitate the gathering and removal of the matrix 50. Once processed, the matrix 50 may travel through an exit 714 (e.g., a spout, funnel, pipe, etc.) to an enclosure 716. Like the enclosure 616, the enclosure 716 may be a garbage bag, a mesh bag, etc., configured to receive the processed matrices 50. In embodiments, the enclosure 716 may be readily removable from the labeling apparatus 700, such that a user may easily dispose of the matrices 50 disposed therein.

The mobile labeling apparatus 700 may provide for a labeling apparatus that may be relatively easy to relocate while allowing for streamlined management and disposal of label matrices. The labeling apparatus 700 may be a relatively compact system, which is desirable in applications where tight maneuvering is required and/or where space is otherwise limited.

Figure 19:
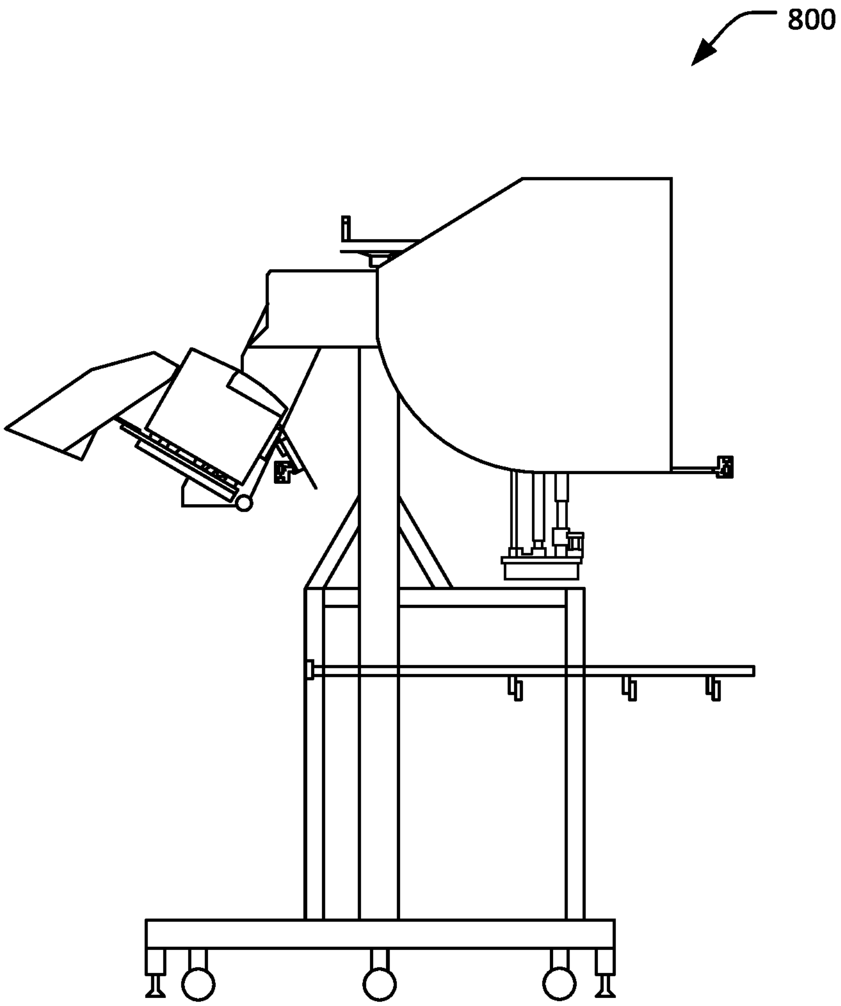
FIG. 19 is a side view of a label printing and apply system, according to yet another embodiment of the disclosure.

FIG. 19 depicts a labeling apparatus 800, according to another embodiment of the present disclosure. Like the mobile labeling apparatus 700, the labeling apparatus 800 may be made mobile via wheels, casters, tracks, et cetera. Similar to the labeling apparatus 100, the labeling apparatus 800 may also include a printer and an automated arm that is configured to pick up printed labels from the printer with a tamp head (e.g., via a vacuum charge), move the label, and apply the printed to a package or other substrate. In embodiments, the labeling apparatus 800 may include a spray or other device secured to the tamp head for dispersing a fluid to wet/activate an adhesive (e.g., a displaceable/dissolvable liner and/or an activatable adhesive) on the collected label. Any suitable combination of sensors (e.g., height sensors, spray sensors, tamp head sensors, etc.) may be arranged on or around the labeling apparatus 800 to facilitate operation of the labeling apparatus 800. For example, the sensors may detect when a package comes within range of the apparatus 800, and may then direct the apparatus 800 to print and apply a label thereto. As another example, the sensors may detect if a label picked up by the tamp head is sufficiently wetted for activation.

One advantage of the matrix removal system embodiments described herein may be that the label matrix may be readily routed to a more advantageous location for disposal, rather than merely dropping the matrix from the printer. This makes available space adjacent the printer that would otherwise be taken up by conventional receptacles used to catch the discarded matrices. This space may then be used for more crucial components, such as a conveyor and/or a label application system. Another advantage of the matrix removal system embodiments may be that the matrices may be reduced in size prior to disposal within the matrix receptacle. This allows for a higher density of matrices to be disposed within said receptacle when compared to conventional systems that dispose the used matrices wholesale into the receptacle.

Yet another advantage of the matrix removal system described herein may be that the label matrix preceding the vacuum charged conduit may be made taut via the vacuum forces therein. This tautness may bias the matrix and the attached label strip to remain along a desired path through the printer, as well as overcoming hitches or catches they may experience along this path. This may serve to improve label strip throughput, improve label and label matrix separation within the printer, and/or mitigate printer jamming/blockage from the label strip and matrix. In other words, not only may the matrix removal system provide a better way to dispose of the used label matrices, but the matrix removal system embodiments described herein may improve the performance of the associated printer as well. For example, the matrix removal system embodiments may be retrofit to a preexisting printer or print and apply machine to improve the efficacy thereof.

While example labels (e.g., shipping labels), are used to illustrate the workings of the systems 100 and 600, the artisan will understand that the systems 100 and 600 disclosed herein may be adapted to other similar label application functions, and that such adaptions are within the scope of the present disclosure. Examples of other similar label application functions may include pharmaceutical packaging, food and beverage packaging, parts labeling, etc.

The artisan will understand that the labeling system 100 and/or the printer 1000 disclosed herein may include or have associated therewith electronics (e.g., the computing system 160, the sensors 128, the pause sensor 1060, the computer-readable medium 1015, et cetera). The electronics may be used to control and modify the operation of the labeling system (e.g., to change the timing of the systems 100, 1000, to turn the system 100, 1000 on and off, to dynamically control the system 100 in response to a sensor 128 detection, et cetera). In some example embodiments, the processor or processors may be configured through particularly configured hardware, such as an application specific integrated circuit (ASIC), field-programmable gate array (FPGA), etc., and/or through execution of software to allow the labeling system 100 to function in accordance with the disclosure herein. The electronics may further comprise a communication system to allow the printer 1000 to be communicably coupled to another device with a wired (e.g., ethernet, USB, etc.) and/or wireless (e.g., cloud, Wi-Fi, Bluetooth, etc.) connection.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. Not all steps listed in the drawings need be carried out in exactly the order shown.

The invention claimed is:

1. A duplex printer system, for printing indicia on a first label and a second label, comprising:

a printer housing;

a plurality of print heads configured to generate a print output;

a label tray configured to receive said first label and said second label after printing;

a peel bar extending from said printer housing, said peel bar being configured to remove a liner matrix from said first label and said second label;

a label roller configured to propel said first label and said second label through said printer housing;

a driven roller configured to propel said liner matrix through said printer housing and into a vacuum charged conduit;

a pump having a matrix processer operably coupled to said conduit, said pump being configured to charge said conduit with said vacuum, said matrix processor being configured to shred said liner matrix into smaller portions; and, a pause sensor;

wherein:

said driven roller propels said liner matrix away from said label tray;

said driven roller propels said liner matrix faster than said label roller propels said first label and said second label;

said pause sensor is configured to detect a presence of said first label within said label tray;

said duplex printer system is configured to halt movement of said second label in response to a pause sensor detection of said first label within said label tray;

said label roller is configured to roll back said second label a first distance after said first label is printed to bring said second label into a print-ready position; and said driven roller is configured to roll back said liner matrix a second distance at the same time said label roller rolls back said second label said first distance, said second distance being less than said first distance.

2. The system of claim 1, further comprising an automated label application arm configured to pick up said first label and said second label from said label tray after printing.

3. The system of claim 1, wherein said label roller is configured to adjust a position of said first label or said second label prior to said first label or said second label engaging with said peel bar.

4. The system of claim 3, wherein said label roller is configured to adjust said position of said first label or said second label at least 2 millimeters from said printer housing.

5. The system of claim 1, wherein said second label is not printed until after said second label is backed up.

6. The system of claim 1, wherein said first distance is up to 2 inches.

7. The system of claim 1, wherein:

said first label has a width side and a length side, said length side being larger than said width side; and, said printer housing, said label roller, and said label tray are configured to receive said first label along said length side.

8. The system of claim 7, further comprising a computer-readable medium having a software, wherein said software is configured to direct said plurality of print heads to rotate said print output up to 360° to change an orientation of said indicia printed on said first label.

9. The system of claim 1, wherein said driven roller propels said liner matrix in a range of 2% to 7% faster than said label roller propels said first label and said second label.

10. The system of claim 1, wherein said first label and said second label are repositionable to change a print location of indicia on said first label and said second label.

11. A method of operating a duplex printer system, said duplex printer system being configured to print indicia on a first label and a second label, said duplex printer system comprising a printer housing, a print head for generating a print output, a label tray configured to receive said first label and said second label after printing, a peel bar configured to remove a liner matrix from said first label and said second label, a label roller configured to propel said first label and said second label through said printer housing, a driven roller configured to propel said liner matrix through said printer housing, and a pause sensor, said method comprising the steps of:

printing a first set of indicia on said first label;

depositing said first label in said label tray by moving said second label past a print-ready position without printing a second set of indicia on said second label;

detecting a presence of said first label in said label tray with said pause sensor;

halting movement of said second label in response to said pause sensor detection;

backing up said second label a first distance to said print-ready position with said label roller after said first label is removed from said label tray;

backing up said liner matrix a second distance while said second label is backed up to said print-ready position;

printing said second set of indicia on said second label after said second label is returned to said print-ready position;

peeling said liner matrix from said first label and said second label with said peel bar; and, directing said liner matrix away from said label tray with said driven roller;

wherein said second distance is less than said first distance.

12. The method of claim 11, further comprising a step of using said driven roller to back up said liner matrix said second distance when said second label is rewound to said print-ready position.

13. The method of claim 11, further comprising steps:

protruding said first label from said printer housing after printing on said first label; and, adjusting a position of said first label prior to peeling said liner matrix from said first label with said peel bar.

14. The method of claim 13, wherein said position of said first label, prior to peeling said liner matrix from said first label with said peel bar, is adjusted up to ten millimeters.

15. The method of claim 11, further comprising steps of:

running said first label and said second label through said printer housing such along a length side of said first label and said second label; and, reorienting said print head print output to change a print location of said indicia on said first label and said second label.

16. The method of claim 11, further comprising steps of:

directing, with said driven roller, said liner matrix through a vacuum charged tube to a matrix processor; and, cutting said liner matrix into smaller portions with said matrix processor.

* * * * *